United States Patent
Naruse

(10) Patent No.: US 8,286,141 B2
(45) Date of Patent: Oct. 9, 2012

(54) INSTRUCTION-TRACE GENERATION PROGRAM, INSTRUCTION-TRACE GENERATING DEVICE, AND INSTRUCTION-TRACE GENERATING METHOD

(75) Inventor: Akira Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 880 days.

(21) Appl. No.: 12/404,077

(22) Filed: Mar. 13, 2009

(65) Prior Publication Data

US 2009/0328006 A1 Dec. 31, 2009

(30) Foreign Application Priority Data

Jun. 26, 2008 (JP) ................................. 2008-167284

(51) Int. Cl.
*G06F 9/44* (2006.01)

(52) U.S. Cl. ........................ 717/128; 717/124; 717/130

(58) Field of Classification Search ........................ None
See application file for complete search history.

(56) References Cited

U.S. PATENT DOCUMENTS

| | | | |
|---|---|---|---|
| 5,784,607 A * | 7/1998 | Henry et al. ................. | 712/245 |
| 6,853,967 B1 * | 2/2005 | Roberts ........................ | 717/124 |
| 7,134,117 B2 * | 11/2006 | Swaine ......................... | 717/128 |
| 7,305,660 B2 * | 12/2007 | Ageyev et al. ................ | 717/128 |
| 7,334,221 B1 * | 2/2008 | Shapiro ........................ | 717/124 |
| 7,689,974 B1 * | 3/2010 | Pavlyushchik ................ | 717/130 |
| 8,117,602 B2 * | 2/2012 | Pavlyushchik ................ | 717/130 |
| 2002/0165885 A1 * | 11/2002 | Kumhyr et al. ............... | 707/536 |
| 2006/0101415 A1 * | 5/2006 | Evans et al. .................. | 717/128 |

FOREIGN PATENT DOCUMENTS

JP  A 2002-342114  11/2002

OTHER PUBLICATIONS

Min Gyung Kang, Emulating Emulation-Resistant Malware, 2009, ACM, 12 pages, <URL: http://delivery.acm.org/10.1145/1660000/1655151/p11-kang.pdf>.*

Hoan Anh Nguyen, A Graph-based Approach to API Usage Adaptation, 2010, ACM, 20 pages, <URL: http://delivery.acm.org/10.1145/1870000/1869486/p302-nguyen.pdf>.*

(Continued)

*Primary Examiner* — Thuy Dao
*Assistant Examiner* — Hua Lu
(74) *Attorney, Agent, or Firm* — Greer, Burns & Crain, Ltd.

(57) ABSTRACT

An instruction trace of a first instruction string is generated from a second instruction string obtained by sampling, at predetermined intervals, the first instruction string. The second instruction string is divided into partial instruction strings. A combination of the partial instruction strings is selected based on the similarity of stored partial instruction strings. A plurality of combination patterns are generated by combining instructions included in the selected partial instruction strings. A likelihood is calculated for each of the combination patterns, and the combination patterns are stored in the storage unit based on the likelihood.

15 Claims, 20 Drawing Sheets

```
main() {
    while (TRUE) {
        func_M();
    }
} func_M() {
    func_A();
    for (i=0; i<3; i++) {
        func_B();
    }
    func_C();
}
```

OTHER PUBLICATIONS

James Newsome, Replayer: Automatic Protocol Replay by Binary Analysis, 2006, ACM, <URL: http://delivery.acm.org/10.1145/1190000/1180444/p311-newsome.pdf>.*

Ansuman Banerjee, Golden Implementation Driven Software Debugging, 2010, ACM. 10 pages, <URL: http://delivery.acm.org/10.1145/1890000/1882319/p177-banerjee.pdf>.*

Dawn Song, BitBlaze: A new Approach to Computer Security via Binary Analysis, 2008, Google Scholar, 25 pages, <URL: http://www.springerlink.com/content/j345p1214231552q/fulltext.pdf>.*

Mike Fournigault, Reverse Engineering of Embedded Software Using Syntactic Pattern Recognition, 2006, Google Scholar, 10 pages, <URL: http://www.springerlink.com/content/j345p1214231552q/fulltext.pdf>.*

* cited by examiner

FIG.1

```
main() {
    while (TRUE) {
        func_M();
    }
} func_M() {
    func_A();
    for (i=0; i<3; i++) {
        func_B();
    }
    func_C();
}
```

FIG.4

| P-1 | P-2 | P-3 | P-4 | P-5 | P-6 | P-7 |
|---|---|---|---|---|---|---|
| func_A: 0 | func_A: 6 | func_A: 5 | func_A: 4 | func_A: 3 | func_A: 2 | func_A: 1 |
| func_A: 7 | func_B: 3 | func_B: 2 | func_B: 1 | func_B: 0 | func_A: 9 | func_A: 8 |
| func_B: 4 | func_B: 0 | func_B: 9 | func_B: 8 | func_B: 7 | func_B: 6 | func_B: 5 |
| func_B: 1 | func_B: 7 | func_B: 6 | func_B: 5 | func_B: 4 | func_B: 3 | func_B: 2 |
| func_B: 8 | func_B: 4 | func_B: 3 | func_B: 2 | func_B: 1 | func_B: 0 | func_B: 9 |
| func_B: 5 | func_C: 1 | func_C: 0 | func_B: 9 | func_B: 8 | func_B: 7 | func_B: 6 |
| func_C: 2 | func_C: 8 | func_C: 7 | func_C: 6 | func_C: 5 | func_C: 4 | func_C: 3 |
| func_C: 9 | | | | | | |

|     | P-1 | P-2 | P-3 | P-4 | P-5 | P-6 | P-7 |
|-----|-----|-----|-----|-----|-----|-----|-----|
| P-1 | -   | 65  | 62  | 75  | 79  | 97  | 110 |
| P-2 | -   | -   | 104 | 85  | 81  | 65  | 62  |
| P-3 | -   | -   | -   | 97  | 91  | 72  | 65  |
| P-4 | -   | -   | -   | -   | 112 | 91  | 81  |
| P-5 | -   | -   | -   | -   | -   | 97  | 85  |
| P-6 | -   | -   | -   | -   | -   | -   | 104 |
| P-7 | -   | -   | -   | -   | -   | -   | -   |

| CLASSIFICATION | | SCORE |
|---|---|---|
| FUNCTION NAMES UNMATCHED | | 0 |
| FUNCTION NAMES MATCHED | | 10 |
| DIFFERENCE IN INNER-FUNCTION OFFSET | ≤ -5 | 1 |
| | -4 | 2 |
| | -3 | 3 |
| | -2 | 4 |
| | -1 | 5 |
| | 0 | 1 |
| | 1 | 5 |
| | 2 | 4 |
| | 3 | 3 |
| | 4 | 2 |
| | 5 ≤ | 1 |

| CLASSIFICATION | | SCORE |
|---|---|---|
| FUNCTION NAMES UNMATCHED | | 0 |
| FUNCTION NAMES MATCHED | | 10 |
| DIFFERENCE IN INNER-FUNCTION OFFSET | ≤ -5 | 1 |
| | -4 | 1 |
| | -3 | 1 |
| | -2 | 1 |
| | -1 | 1 |
| | 0 | 1 |
| | 1 | 5 |
| | 2 | 4 |
| | 3 | 3 |
| | 4 | 2 |
| | 5 ≤ | 1 |

| CLASSIFICATION | | SCORE |
|---|---|---|
| FUNCTION NAMES UNMATCHED | | 0 |
| FUNCTION NAMES MATCHED | | 5 |
| DIFFERENCE IN BB NUMBER | ≤ -2 | 0 |
| | -1 | 1 |
| | 0 | 5 |
| | 1 | 1 |
| | 2 ≤ | 0 |
| DIFFERENCE IN INNER-BB OFFSET | ≤ -5 | 1 |
| | -4 | 2 |
| | -3 | 3 |
| | -2 | 4 |
| | -1 | 5 |
| | 0 | 1 |
| | 1 | 5 |
| | 2 | 4 |
| | 3 | 3 |
| | 4 | 2 |
| | 5 ≤ | 1 |

| CLASSIFICATION | | SCORE |
|---|---|---|
| FUNCTION NAMES UNMATCHED | | 0 |
| FUNCTION NAMES MATCHED | | 5 |
| DIFFERENCE IN BB NUMBER | ≤-2 | 0 |
| | -1 | 0 |
| | 0 | 5 |
| | 1 | 1 |
| | 2≤ | 0 |
| DIFFERENCE IN INNER-BB OFFSET | ≤-5 | 1 |
| | -4 | 1 |
| | -3 | 1 |
| | -2 | 1 |
| | -1 | 1 |
| | 0 | 1 |
| | 1 | 5 |
| | 2 | 4 |
| | 3 | 3 |
| | 4 | 2 |
| | 5≤ | 1 |

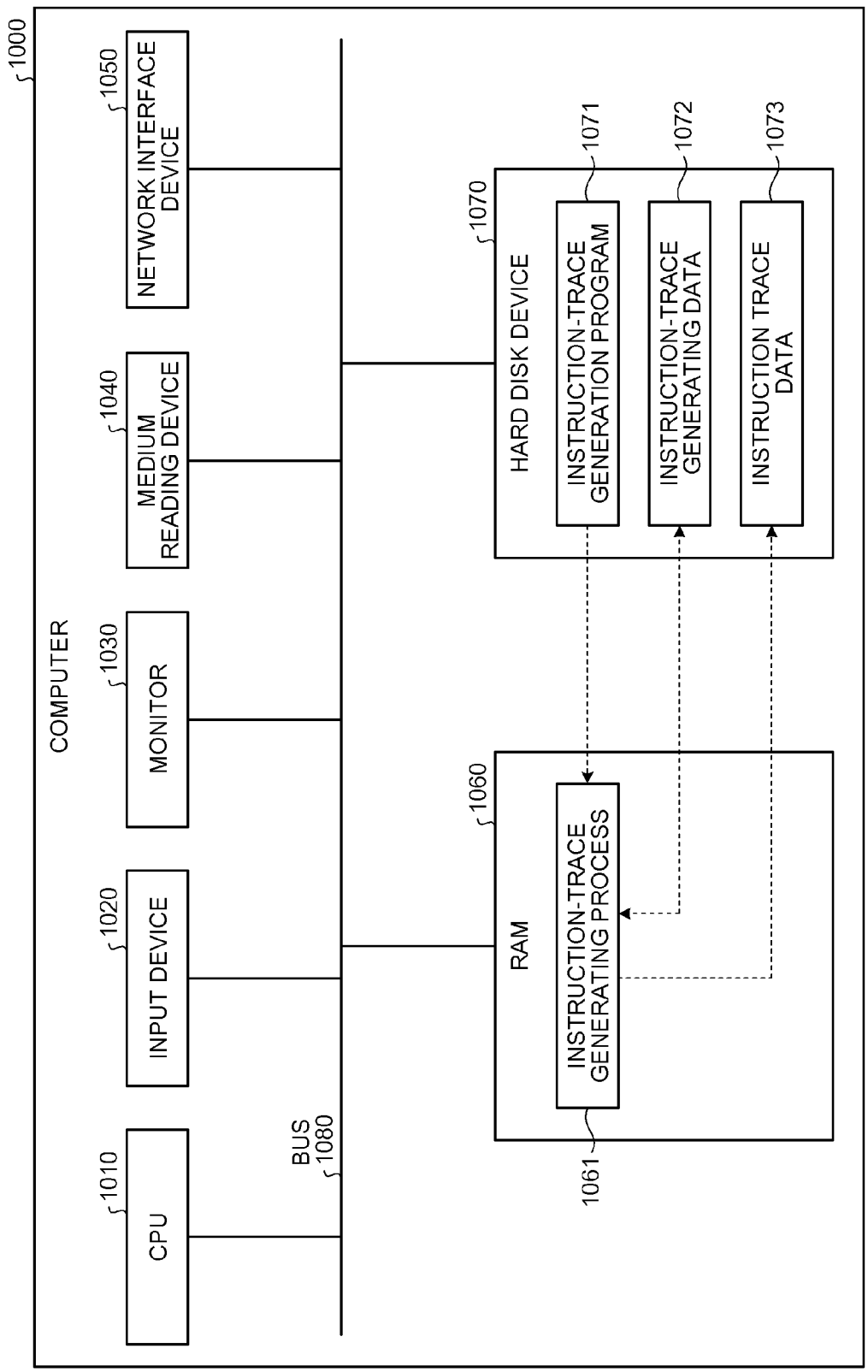

INSTRUCTION-TRACE GENERATION PROGRAM, INSTRUCTION-TRACE GENERATING DEVICE, AND INSTRUCTION-TRACE GENERATING METHOD

CROSS-REFERENCE TO RELATED APPLICATION(S)

This application is based upon and claims the benefit of priority of the prior Japanese Patent Application No. 2008-167284, filed on Jun. 26, 2008, the entire contents of which are incorporated herein by reference.

FIELD

The embodiments discussed herein are directed to an instruction-trace generation program, instruction-trace generating device, and instruction-trace generating method for generating an instruction trace.

BACKGROUND

Conventionally, technologies of obtaining an instruction trace for the purpose of, for example, performance optimization and debugging of an operating program, have been known. The instruction trace is data in which individual instructions executed by a processor are recorded in time series. By referring to the instruction trace, it is possible to understand in detail that the processor executes which instruction in which order to operate the program. With this, appropriate measures can be taken for performance optimization and other purposes.

While obtaining an instruction trace is very effective way for optimizing program performance and other purposes as explained above, this may disadvantageously cause overhead. For example, when an instruction trace is obtained with an interrupt for each instruction, such overhead may cause the program execution time several hundreds-fold to several thousands-fold. With the program execution time at the time of obtaining an instruction trace such different from that at normal time, the obtained instruction trace cannot reflect the behavior of the program at normal time, and is inappropriate as information for understanding the behavior of the program.

As a technology for reducing overhead of a program at the time of obtaining an instruction trace, a technology of not obtaining a trace of all instructions but obtaining a trace of only the branch instructions is known. If the frequency of appearance of a branch instruction in an instruction string of a program is one in ten instructions, by obtaining a trace of only the branch instructions, overhead can be reduced to approximately 1/10. Also, once the trace of the branch instructions is obtained, it is possible to estimate to some degree which instruction is executed in which order while a branch instruction is executed by comparing the trace of the branch instructions and the instruction strings in the program.

An example of conventional technologies is disclosed in Japanese Laid-open Patent Publication No. 2002-342114.

However, even when overhead can be reduced to approximately 1/10 by obtaining a trace of only the branch instructions, the behavior at the time of obtaining a trace may be different from that at normal time depending on the program. To get around this, when the frequency of obtaining a trace is further decreased to reduce overhead, it becomes disadvantageously difficult to estimate which instruction is executed in which order among the sampled instructions.

SUMMARY

According to an aspect of the invention, an instruction-trace generating device generates an instruction trace of a first instruction string from a second instruction string obtained by sampling, at predetermined intervals, the first instruction string executed a plurality of times. The instruction-trace generating device includes a dividing unit that divides the second instruction string into partial instruction strings and causes the partial instruction strings obtained through division to be stored in a storage unit; a similarity calculating unit that calculates a similarity for each combination of all of the partial instruction strings stored in the storage unit; a selecting unit that selects one of the combinations of the partial instruction strings based on the similarity calculated by the similarity calculating unit; a combination-pattern generating unit that generates a plurality of combination patterns by combining instructions included in the partial instruction strings selected by the selecting unit; a likelihood calculating unit that calculates a likelihood for each of the combination patterns generated by the combination-pattern generating unit; and a partial-instruction-string replacing unit that causes the combination patterns to be stored in the storage unit based on the likelihood calculated by the likelihood calculating unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 is a drawing of an example of a program;

FIG. 4 is a drawing of an example of partial instruction strings;

FIG. 9 is a drawing of an example of a data structure of similarity score data;

FIG. 10 is a drawing of an example of a data structure of likelihood score data;

FIG. 17 is drawing of an example of a data structure of similarity score data;

FIG. 18 is a drawing of an example of a data structure of likelihood score data;

FIG. 22 is a functional block diagram of a computer that executes an instruction-trace generation program.

DESCRIPTION OF EMBODIMENT(S)

With reference to the attached drawings, exemplary embodiments of the instruction-trace generation program, instruction-trace generating device, and instruction-trace generating method disclosed herein are explained in detail below.

[a] First Embodiment

First, a general outline of the instruction-trace generating method according to an embodiment is explained. The instruction-trace generating method according to the present embodiment achieves obtainment of an instruction trace accurately reproducing which instruction is executed in which order even when the trace frequency is decreased to reduce overhead.

Specifically, in the instruction-trace generating method according to the present embodiment, an instruction trace is generated based on sampling data obtained by acquiring an instruction executed by a processor at predetermined intervals. With sufficiently large intervals at which the instruction executed by the processor is obtained, overhead can be reduced, and changes in behavior of the program due to changes in execution time can be suppressed.

As mentioned above, since an instruction trace is generated based on the sampling data, it is assumed in the instruction-trace generating method according to the present embodiment that an instruction string for which an instruction trace is to be obtained has reproducibility. Here, reproducibility means that, when the instruction string for which a trace is to be obtained is executed a plurality of times, instructions in an instruction string are executed in the same order every time.

Here, a program for which a trace is to be obtained is not necessarily programmed in advance so as to have reproducibility. That is, reproducibility may be achieved by equalizing the operation conditions of the program every time, for example, inputting the same data to the program every time. Also, instruction strings for which an instruction trace is to be obtained may be entire or part of instruction strings included in the program.

In the following, the instruction-trace generating method according to the present embodiment is explained with reference to specific examples. FIG. 1 is a drawing of an example of a program. The program depicted in FIG. 1 contains a function "main( )" and a function "func_M( )". The function "main( )" is a function first executed when the program is activated, calling "func_M( )" infinite times. The function "func_M( )" calls "func_A( )" once, then calls "func_B( )" three times, and then calls "func_C( )" once.

It is assumed herein that the part "func_M( )" in the program depicted in FIG. 1 is taken as a part for which a trace is to be obtained and this part has reproducibility. It is also assumed that "func_A( )", "func_B( )", and "func_C( )" executed in "func_M( )" each have 10 instructions. It is further assumed that these functions do not have a branch instruction.

Figure 2:
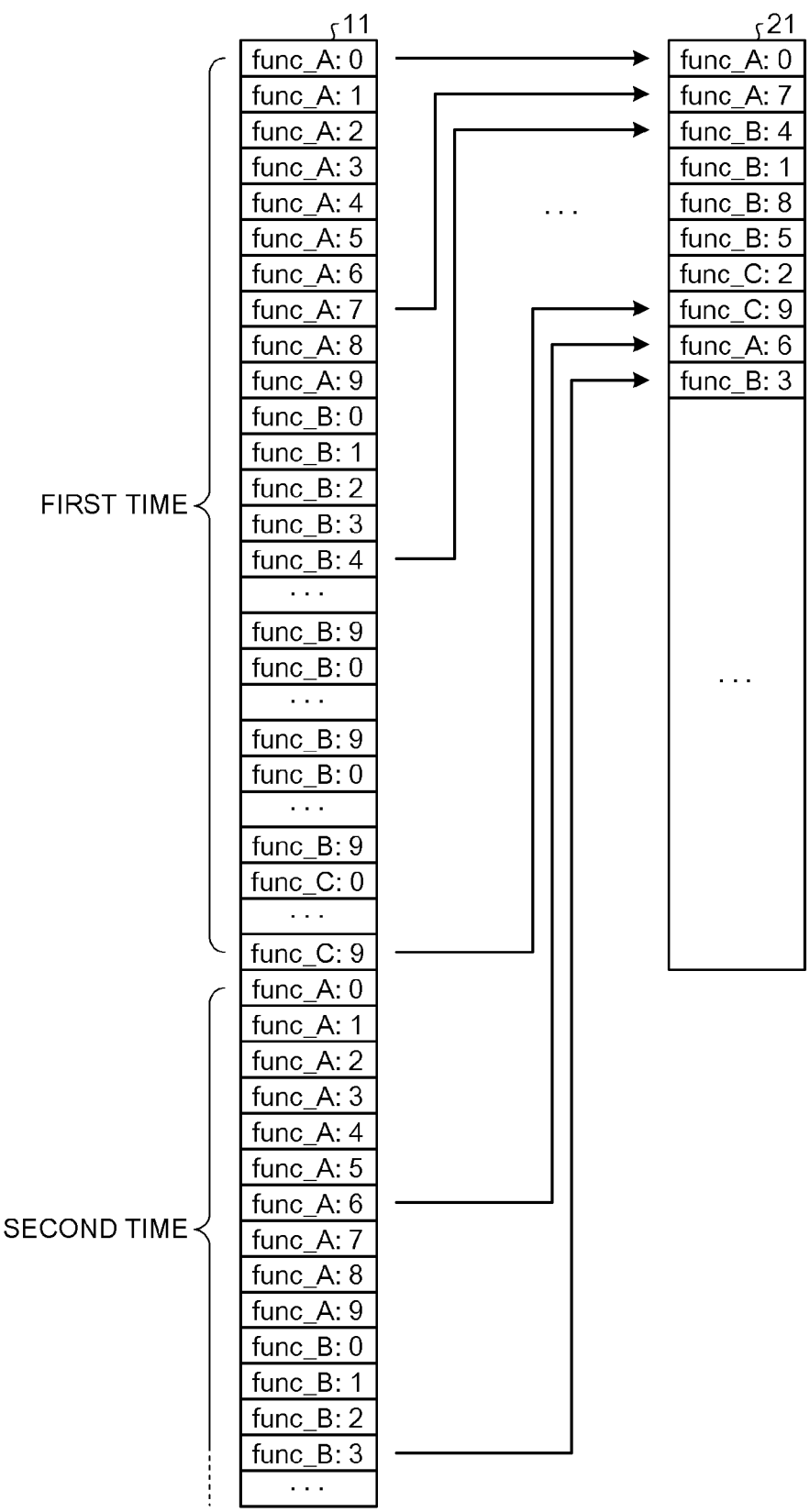
FIG. 2 is a drawing of an example of instruction sampling.

FIG. 2 is a drawing of an example of instruction sampling. In the present embodiment, a character string provided to each instruction has a portion preceding ":", which represents the name of a function to which the instruction belongs, and a portion subsequent to ":", which represents an offset of the instruction with reference to the head of the function (hereinafter, referred to as "inner-function offset"). For example, "func_A:0" indicates that this is a head instruction in a function with a name "func_A".

When the program depicted in FIG. 1 is operated, "func_M( )" is called a plurality of times, and an instruction string 11 depicted in FIG. 2 is executed by the processor. That is, when "func_M( )" is called for the first time, ten instructions corresponding to "func_A( )" are executed once, ten instructions corresponding to "func_B( )" are executed three times, and then ten instructions corresponding to "func_C( )" are executed once. Then, also when "func_M( )" is called the second time onward, the same instructions are executed by the processor in the same order as that for the first time. Here, for simplification, a loop process for executing "func_B( )" three times and instructions for calling or returning to a function are not considered herein.

The instruction string 11 is an instruction string corresponding to an instruction trace. However, when information is obtained every time the processor executes one instruction, overhead is increased, affecting the behavior of the program. To get around this, it is assumed herein that sampling is made for every seven instructions executed by the processor. Note that the sampling interval is set at 7 is merely an example, and the sampling interval may take an arbitrary value with which overhead is sufficiently small.

Figure 3:
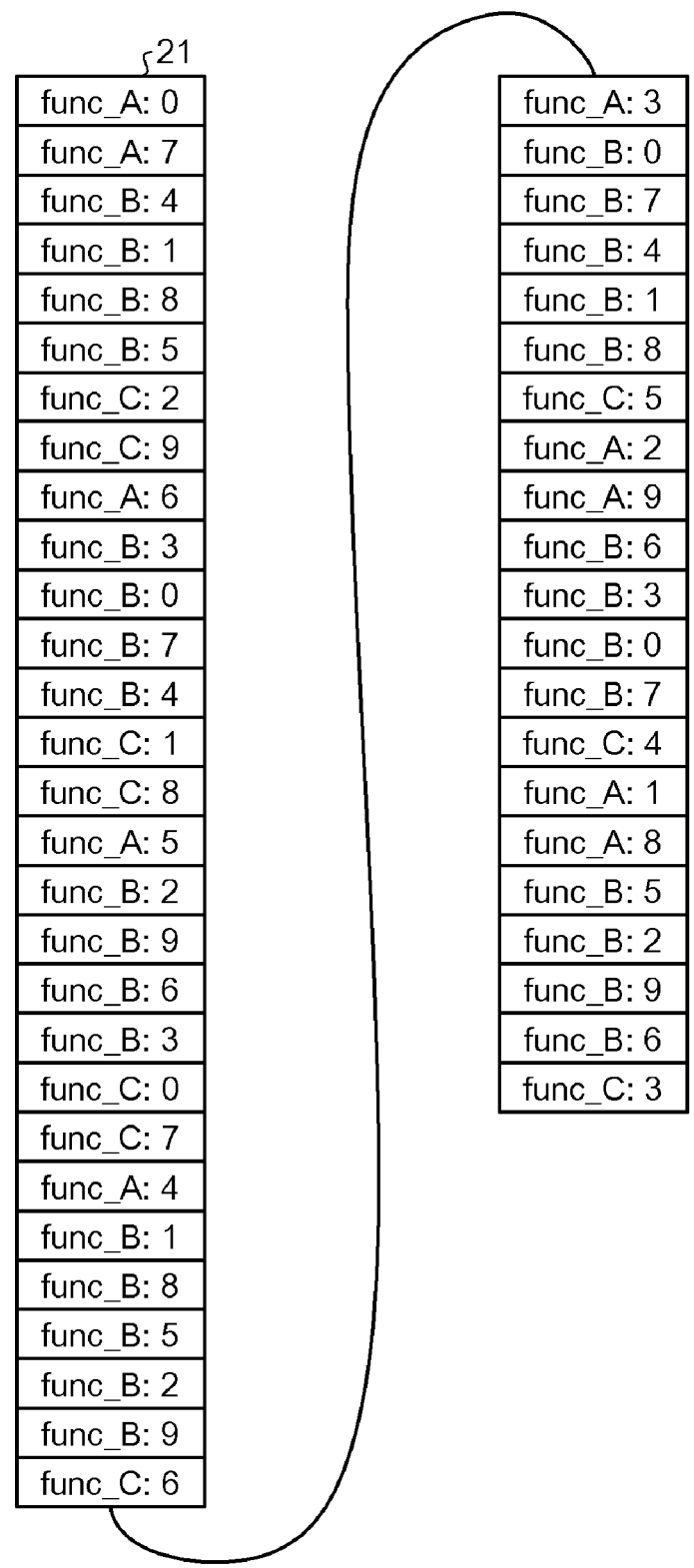
FIG. 3 is a drawing of an example of sampling data.

By sampling an instruction for every seven instructions while calling "func_M( )" many times, sampling data 21 as depicted in FIGS. 2 and 3 are obtained. The sampling data 21 contains instructions as many as those executed by the processor when "func_M( )" for which an instruction trace is to be obtained is called once. Specifically, when "func_M( )" is called once, 50 instructions are executed by the processor as described above, and the sampling data 21 contains 50 instructions. When the sampling data 21 is obtained in this manner, execution of the program depicted in FIG. 1 may be stopped.

After the sampling data 21 is obtained, the sampling data 21 is divided into partial instruction strings. Specifically, in the instruction-trace generating method according to the present embodiment, the sampling data 21 is divided into partial instruction strings in units of samples obtained while "func_M( )" for which an instruction trace is to be obtained is called once.

FIG. 4 is a drawing of an example of partial instruction strings. As depicted in FIG. 4, the sampling data 21 is divided into seven partial instruction strings P-1 to P-7. P-1 is an instruction string obtained by sampling when "func_M( )" is called for the first time, and P-2 an instruction string obtained by sampling when "func_M( )" is called the second time.

Then, a similarity is calculated for each combination of partial instruction strings. Here, the similarity is evaluated higher for a combination of partial instruction strings with a higher possibility of having an adjacently-placed relation in an instruction trace eventually obtained, and is not evaluated highest at the time of perfect matching.

For example, it is assumed that the following are provided:
a partial instruction string A including two instructions "func_A:0" and "func_A:7";
a partial instruction string B including two instructions "func_A:0" and "func_A:7"; and
a partial instruction string C including two instructions "func_A:1" and "func_A:8".

In this case, in the instruction trace eventually obtained, compared with the case where the instructions are placed such that "func_A:0" and "func_A:0" come adjacently in this order, and subsequently "func_A:7" and "func_A:7" come adjacently in this order, there is a higher possibility that the instructions are placed such that "func_A:0" and "func_A:1" come adjacently in this order, and subsequently "func_A:7" and "func_A:8" come adjacently in this order. Therefore, in the example, a combination of the partial instruction string A and the partial instruction string C is evaluated as having a higher similarity than a combination of the partial instruction string A and the partial instruction string B.

Figures 5, 6:
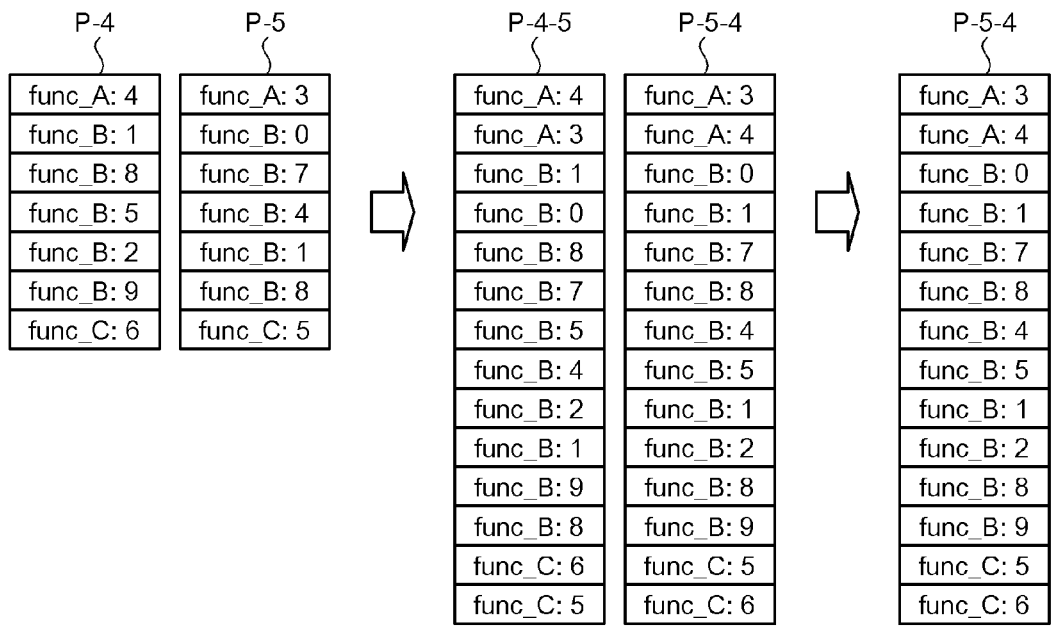
FIG. 5 is a drawing of an example of similarity calculation results.
FIG. 6 is a drawing of an example of combining of partial instruction strings.

The similarity of the combination of partial instruction strings is calculated by totaling similarities for each instruction unit obtained by comparing instructions contained in each partial instruction string sequentially from the head. The similarity for each instruction unit is evaluated higher as the function names of the instructions match and an absolute value of the difference in inner-function offset is closer to 1. On the other hand, when the function name of the instruction does not match or the difference in inner-function offset is large even if the function names of the instructions match, the similarity for each instruction unit is evaluated low. FIG. 5 is a drawing of an example of similarity calculation results. As depicted in FIG. 5, the similarity is calculated for every combination of the partial instruction strings.

Then, a combination of partial instruction strings with the highest similarity calculated is selected. For example, if the similarity calculation results are as depicted in FIG. 5, a combination of P-4 and P-5 is selected as a combination of partial instruction string with the highest similarity.

Then, two partial instruction strings included in the selected combination are combined into one. Combining of partial instruction strings is performed by generating a plurality of combination patterns with instructions contained in the partial instruction strings are alternately combined and selecting one with the highest likelihood thereamong. Then, the two partial instruction strings before combining are replaced by the partial instruction string after combining. Here, the likelihood means plausibility of the arrangement of instructions.

Here, in place of combining only the combination of the partial instruction strings with the highest similarity for calculating a likelihood, a predetermined number of combinations of partial instruction strings may be selected in descending order of similarity, a combination pattern is generated for each combination, and replacement may be made with a combination with the highest likelihood obtained. For example, when a combination pattern C obtained by combining partial instruction strings A and B has the highest likelihood, the partial instruction strings A and B may be replaced with the pattern C.

FIG. 6 is a drawing of an example of combining of partial instruction strings. As depicted in FIG. 6, based on the selected two partial instruction strings P-4 and P5, P-4-5 obtained by alternately combining instructions so that the instructions contained in P-4 come first and P-5-4 obtained by alternately combining instructions so that the instructions contained in P-5 come first are generated. Then, a likelihood of each of these generated P-4-5 and P-5-4 is calculated.

The likelihood is calculated by comparing adjacent instructions from the head of a partial instruction string to calculate a likelihood for each instruction and totaling the likelihoods for each instruction unit. The likelihood for each instruction unit is evaluated higher as the function names of the instructions match, the inner-function offset values are placed in the ascending order, and their difference is closer to 1. On the other hand, in the case where the name of the function does not match, when the inner-function offset values are in the descending order even if the function names of the instructions match, and when the difference is large even if the function names of the instructions match and the inner-function offset values are in the ascending order, the likelihood for each unit is evaluated as low. This is because, when the order of the instruction strings is as the execution order, there should be a high possibility that the function names of the adjacent instructions match and the offset values are in the ascending order.

In the example depicted in FIG. 6, P-5-4 in which many inner-function offset values are in the ascending order is selected, with which P-4 and P-5 are replaced. Then, a similarity of each combination of partial instruction strings is calculated, partial instruction strings of combination with the highest similarity are combined, and then two partial instruction strings before combining is replaced with a partial instruction string after combining. By repeating this process, the partial instruction strings are eventually combined into one. The partial instruction string combined in this manner can be expected to be identical to a portion of an instruction string 11 depicted in FIG. 2 for the first time, that is, an instruction trace to be obtained.

Here, combining of partial instruction strings are explained in further detail. When one or both of the partial instruction strings to be combined are obtained by combining partial instruction strings, the partial instruction string obtained through combining is once divided into initial partial instruction strings at division, and then combination patterns are generated. At this time, combination patterns are generated so that the order of the partial instruction strings already combined is not changed. For example, as depicted in FIG. 7, when P-7 not yet subjected to combining and P-5-4 obtained by combining P-4 and P-5 with P-5 as the head are combined, combination patterns are generated so that P-4 does not precede P-5.

Figure 7:
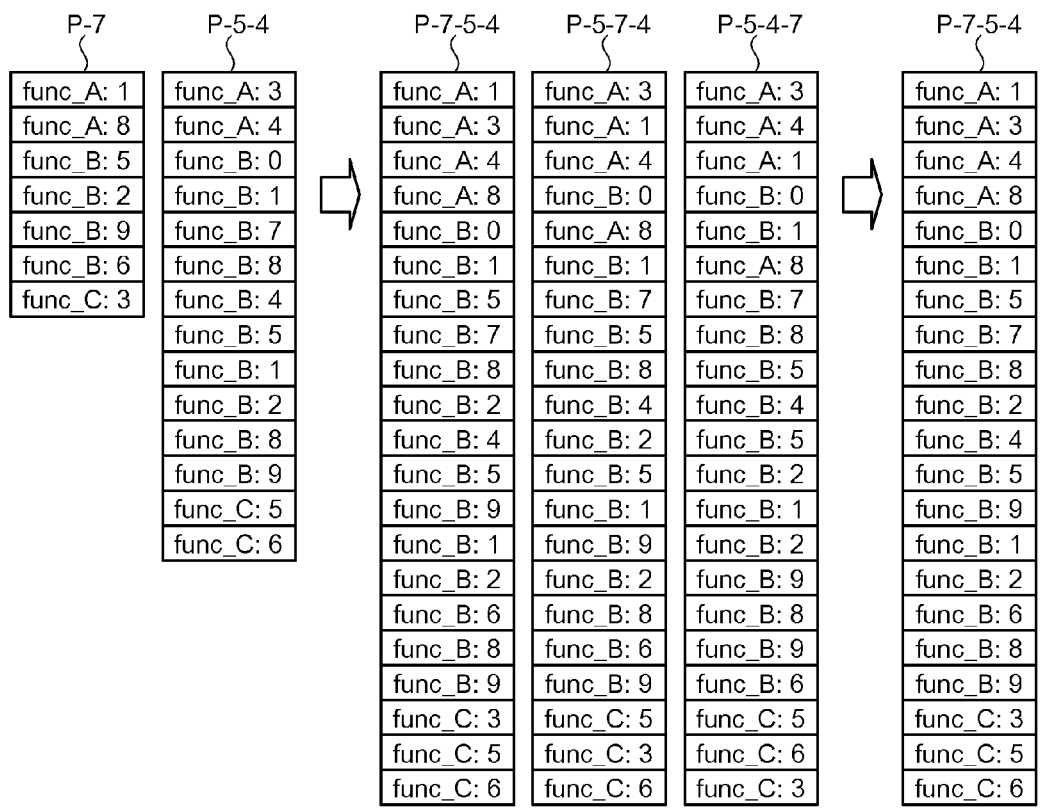
FIG. 7 is a drawing of another example of combining of partial instruction strings.

That is, in the example of FIG. 7, generated as combination patterns are P-7-5-4 obtained by alternately combining the instructions in the order of P-7, P-5, and then P-4, P-5-7-4 obtained by alternately combining the instructions in the order of P-5, P-7, and then P-4, and P-5-4-7 obtained by alternately combining the instructions in the order of P-5, P-4, and then P-7. On the other hand, a combination pattern in which P-4 precedes P-5 is not generated, such as a combination pattern obtained by alternately combining the instructions in the order of P-4, P-5, and then P-7.

Figure 8:
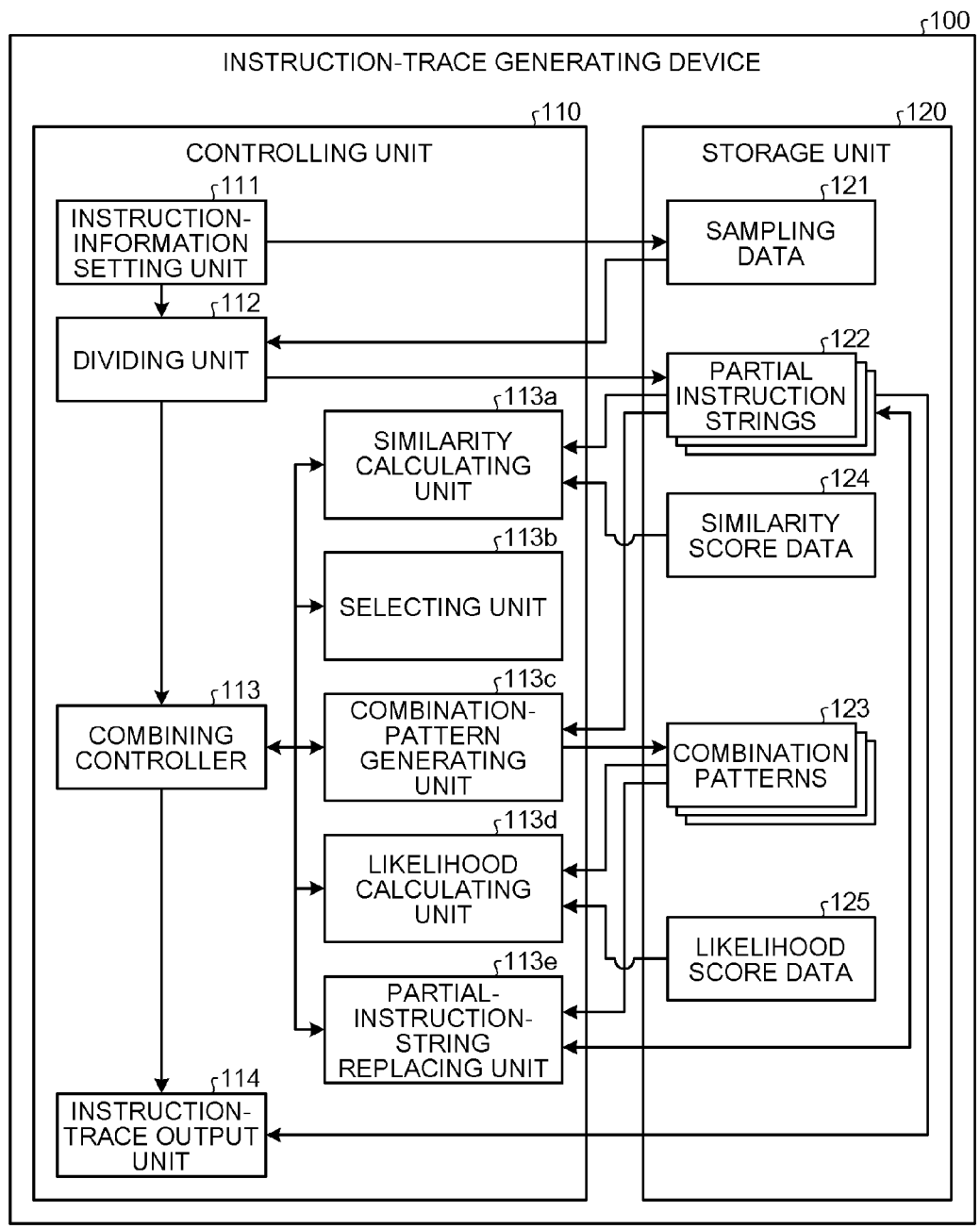
FIG. 8 is a functional block diagram depicting the configuration of an instruction-trace generating device according to a first embodiment.

Next, the configuration of the instruction-trace generating device that executes the instruction-trace generating method according to the present embodiment is explained. FIG. 8 is a functional block diagram depicting the configuration of an instruction-trace generating device 100 according to the first embodiment. As depicted in FIG. 8, the instruction-trace generating device 100 includes a controlling unit 110 and a storage unit 120.

The controlling unit 110 is a controlling unit that controls the entire instruction-trace generating device 100, and includes an instruction-information setting unit 111, a dividing unit 112, a combining controller 113, a similarity calculating unit 113*a*, a selecting unit 113*b*, a combination-pattern generating unit 113*c*, a likelihood calculating unit 113*d*, a partial-instruction-string replacing unit 113*e*, and an instruction-trace output unit 114.

The instruction-information setting unit 111 sets instruction information in sampling data 121 stored in the storage unit 120. Sampling data 121 is data obtained by sampling an instruction executed by the processor at predetermined intervals while an instruction string for which an instruction trace is to be obtained is executed a plurality of times, and contains a sufficient number of instructions for generating an instruction trace.

Specifically, the instruction-information setting unit 111 obtains, for each instruction included in the sampling data 121, the function name of the function to which the instruction belongs and the inner-function offset of the instruction, and then associates the obtained function name and inner-function offset with the instruction for setting as instruction information. Here, the function name and the inner-function offset can be obtained by, for example, checking the address of the instruction against a symbol table in the program.

The dividing unit 112 divides the sampling data 121 into a plurality of partial instruction strings 122 in units sampled while an instruction string for which an instruction trace is to be obtained is executed once, and then stores the partial instruction strings in the storage unit 120. For example, when the number of instruction strings for which an instruction trace is to be obtained is T and the sampling interval is P, the sampling data 121 is divided for each T/P, thereby easily performing division in units mentioned above. Here, if the function near the head of the instruction string for which an instruction trace is to be obtained is known, the sampling data 121 can be divided in units mentioned above with reference to that function. Also, the function or instruction string as a reference for division may be included in advance in the program, and then the sampling data 121 may be divided with reference to this. Furthermore, these techniques may be arbitrarily combined.

The combining controller 113 controls the similarity calculating unit 113a, the selecting unit 113b, the combination-pattern generating unit 113c, the likelihood calculating unit 113d, and the partial-instruction-string replacing unit 113e until the partial instruction strings 122 obtained through division by the dividing unit 112 are combined into one in an appropriate order.

The similarity calculating unit 113a calculates a similarity for every combination of the partial instruction strings 122. The similarity is calculated by totaling scores (similarities for the respective instructions) obtained by comparing instructions included in each partial instruction string 122 sequentially from the head and checking the comparison result against similarity score data 124.

An example of the similarity score data 124 is depicted in FIG. 9. As depicted in FIG. 9, in the similarity score data 124, "10" is set as a score when the function names match, and "0", which is lower than "10", is set as a score when the function names do not match. Also, as a score provided based on the difference in inner-function offset when the function names do not match, a higher value is set as an absolute value of the difference is closer to "1". This is because there is a higher possibility that the instruction is executed successively from immediately-previous or next instruction as the absolute value of the difference is closer to "1".

The selecting unit 113b selects a combination of partial instruction strings 122 with the highest similarity based on the similarity calculated by the similarity calculating unit 113a. The combination-pattern generating unit 113c generates a plurality of combination patterns 123 by combining initial partial instruction strings 122 at division included in the combination selected by the selecting unit 113b. A specific method of generating the combination patterns 123 has already been explained by using FIGS. 6 and 7. The combination patterns 123 correspond to P-4-5 and P-5-4 depicted in FIG. 6 and P-7-5-4, P-5-7-4, and P-5-4-7 depicted in FIG. 7.

The likelihood calculating unit 113d calculates a likelihood for each combination pattern 123 generated by the combination-pattern generating unit 113c. The likelihood is calculated by totaling scores (likelihoods for the respective instructions) obtained by comparing adjacent ones of the instructions included in each combination pattern 123 sequentially from the head and checking the comparison result against likelihood score data 125.

An example of the likelihood score data 125 is depicted in FIG. 10. As depicted in FIG. 10, in the likelihood score data 125, "10" is set as a score when the function names match, and "0", which is lower than "10", is set as a score when the function names do not match. Also, as a score provided based on the difference in inner-function offset when the function names do not match, a higher value is set when the difference is positive as an absolute value of the difference is closer to "1". Here, it is assumed that the difference in inner-function offset is calculated by subtracting the inner-function offset of the previous instruction from the inner-function offset of the subsequent instruction, and a positive difference means that the inner-function offsets are placed in the ascending order.

The partial-instruction-string replacing unit 113e selects one of the combination patterns 123 with the highest likelihood based on the likelihood calculated by the likelihood calculating unit 113d. The partial-instruction-string replacing unit 113e then replaces the partial instruction strings 122 included in the combination selected by the selecting unit 113b with the selected combination pattern 123 as a partial instruction string 122, and then stores it in the storage unit 120. Here, after the combination pattern 123 selected by the partial-instruction-string replacing unit 113e is stored as the partial instruction string 122 in the storage unit 120, the other combination patterns 123 are deleted.

Here, the combination pattern 123 selected by the partial-instruction-string replacing unit 113e is stored as the partial instruction string 122 in the storage unit 120 in place of the partial instruction strings 122 included in the combination selected by the selecting unit 113b. However, this is not meant to be restrictive. Specifically, any process can be made as long as the combination pattern 123 with the highest likelihood can be used in the subsequent processing in place of the partial instruction strings 122 included in the combination selected by the selecting unit 113b.

After the partial instruction strings 122 are combined into one instruction string under the control of the combining controller 113, the instruction-trace output unit 114 outputs the instruction string obtained through combining as an instruction trace.

The storage unit 120 is a storage device that stores various information, having stored therein the sampling data 121, the partial instruction strings 122, the combination patterns 123, the similarity score data 124, and the likelihood score data 125. Since such various data stored in the storage unit 120 have already been explained, they are not explained herein.

Figure 11:
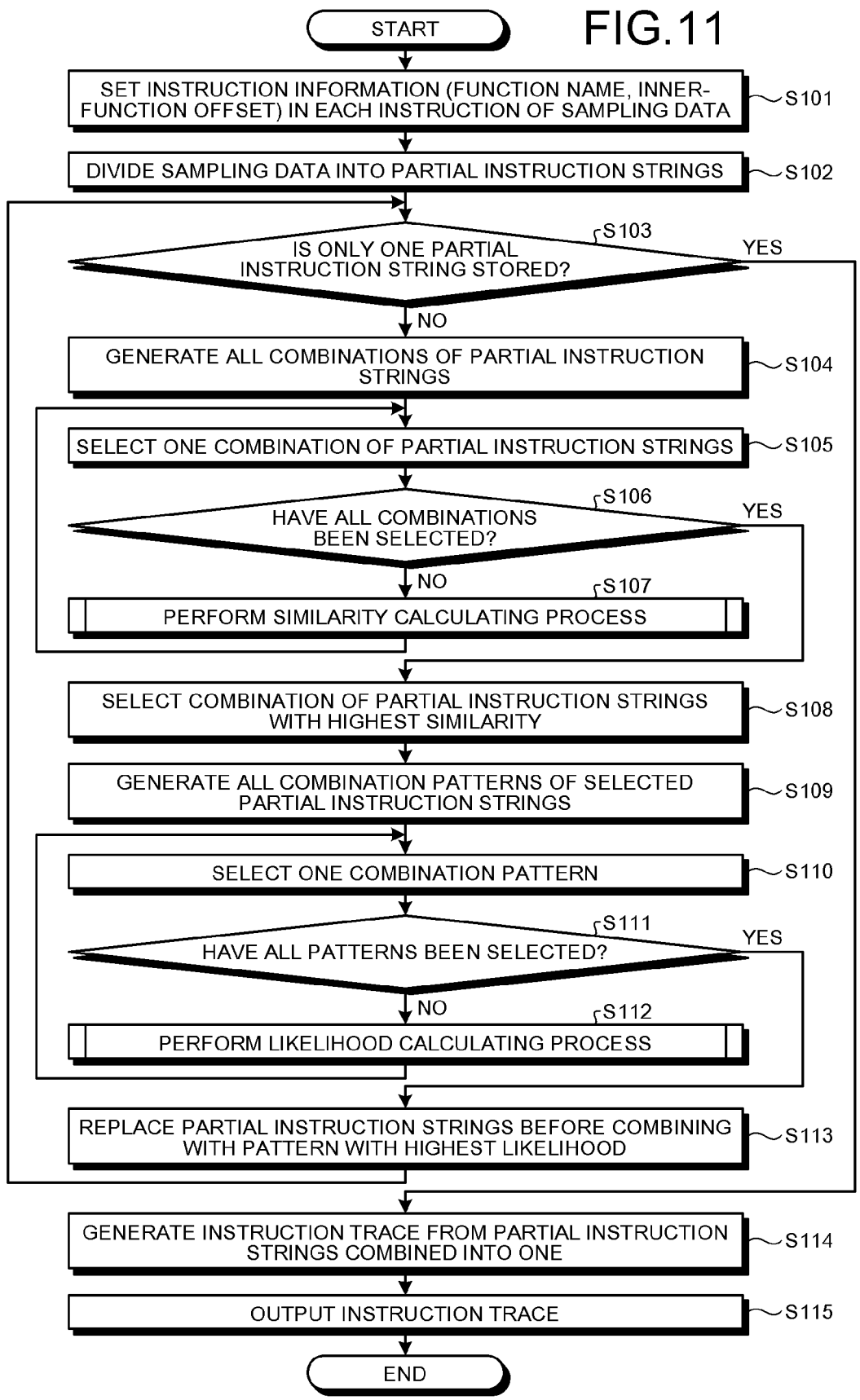
FIG. 11 is a flowchart of a procedure of an instruction-trace generating process.

Next, the operation of the instruction-trace generating device 100 depicted in FIG. 8 is explained. FIG. 11 is a flowchart of a procedure of an instruction-trace generating process by the instruction-trace generating device 100.

In the instruction-trace generating process, the instruction-information setting unit 111 first sets a function name and an inner-function offset as instruction information in each instruction included in the sampling data 121 sampled in advance (step S101). Then, the dividing unit 112 divides the sampling data 121 into partial instruction strings 122, and stores the partial instruction strings 122 in the storage unit 120 (step S102).

Here, when the number of partial instruction strings 122 stored in the storage unit 120 is not one ("No" at step S103), the similarity calculating unit 113a generates all combinations of the partial instruction strings 122 (step S104). The similarity calculating unit 113a then tries to select unselected one of the generated combinations (step S105), and when it can select one ("No" at step S106) performs a similarity calculating process, which will be explained hereinafter, on the selected combination to calculate a similarity (step S107).

After the similarity calculating process is completed, the similarity calculating unit 113a returns to step S105 to try to obtain a next unselected combination. When all combinations have been selected and similarities for all combinations have been calculated ("Yes" at step S106), the selecting unit 113b selects a combination of the partial instruction strings 122 with the highest similarity (step S108).

Then, the combination-pattern generating unit 113c generates a plurality of combination patterns 123 from the selected combination of the partial instruction strings 122 (step S109). The likelihood calculating unit 113d then tries to select unselected one of the generated combination patterns 123 (step S110), and when it can select one ("No" at step S111), performs a likelihood calculating process, which will be explained hereinafter, on the selected combination pattern 123 to calculate a likelihood (step S112).

After the likelihood calculating process is completed, the likelihood calculating unit 113d returns to step S110 to try to obtain a next unselected pattern 123. When all combinations 123 have been selected and likelihoods for all combination patterns 123 have been calculated ("Yes" at step S111), the partial-instruction-string replacing unit 113e replaces the partial instruction strings 122 before combining with the combination pattern 123 with the highest likelihood and stores that pattern as the partial instruction string 122 in the storage unit 120 (step S113). Then, after the process of the partial-instruction-string replacing unit 113e is completed, the processes at step S103 onward are performed again.

In this manner, when steps S103 to S113 are repeatedly performed to combine the partial instruction strings 122 into one ("Yes" at step S103), the instruction-trace output unit 114 performs a process of, for example, deleting the instruction information set at step S101 from the partial instruction string 122 combined into one to generate an instruction trace (step S114). Then, the instruction-trace output unit 114 outputs the generated instruction trace (step S115).

Figure 12:
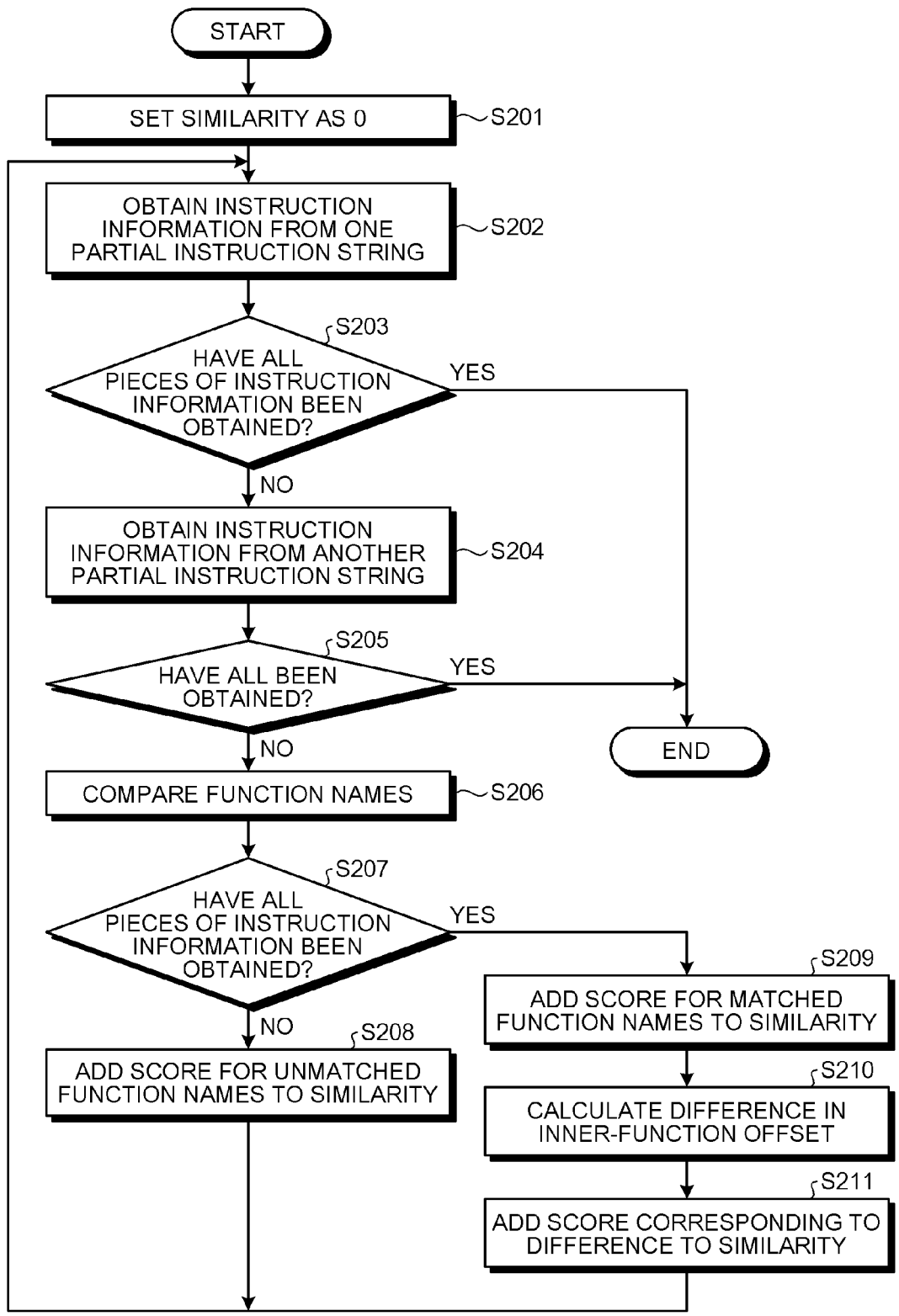
FIG. 12 is a flowchart of a procedure of a similarity calculating process.

FIG. 12 is a flowchart of a procedure of the similarity calculating process at step S107. In the similarity calculating process, the similarity calculating unit 113a first sets the similarity as 0 (step S201). The similarity calculating unit 113a then tries to obtain one of the pieces of instruction information not yet obtained at the head from one of the partial instruction strings 122 for which a similarity is to be obtained (step S202). Here, when all pieces of instruction information of the partial instruction string 122 have been obtained ("Yes" at step S203), the similarity calculating unit 113a ends the similarity calculating process.

On the other hand, when any instruction information can be obtained ("No" at step S203), the similarity calculating unit 113a obtains one of the pieces of instruction information not yet obtained at the head from the other one of the partial instruction strings 122 for which a similarity is to be obtained (step S204). Here, when all pieces of instruction information of the partial instruction string 122 have been obtained ("Yes" at step S205), the similarity calculating unit 113a ends the similarity calculating process.

When any instruction information can be obtained also from the other partial instruction string 122 ("No" at step S205), the similarity calculating unit 113a compares the function names included in the obtained pieces of instruction information (step S206). When the function names do not match ("No" at step S207), the similarity calculating unit 113a obtains a score for unmatched function names from the similarity score data 124 and adds the score to the similarity (step S208), and then restarts the process from step S202.

When the function names match ("Yes" at step S207) the similarity calculating unit 113a obtains a score for matched function names from the similarity score data 124 and adds the score to the similarity (step S209). Furthermore, the similarity calculating unit 113a calculates a difference in inner-function offset included in the obtained pieces of instruction information (step S210). The similarity calculating unit 113a then obtains a score corresponding to the calculated difference from the similarity score data 124 and adds the score to the similarity (step S211), and then restarts the process from step S202.

Figure 13:
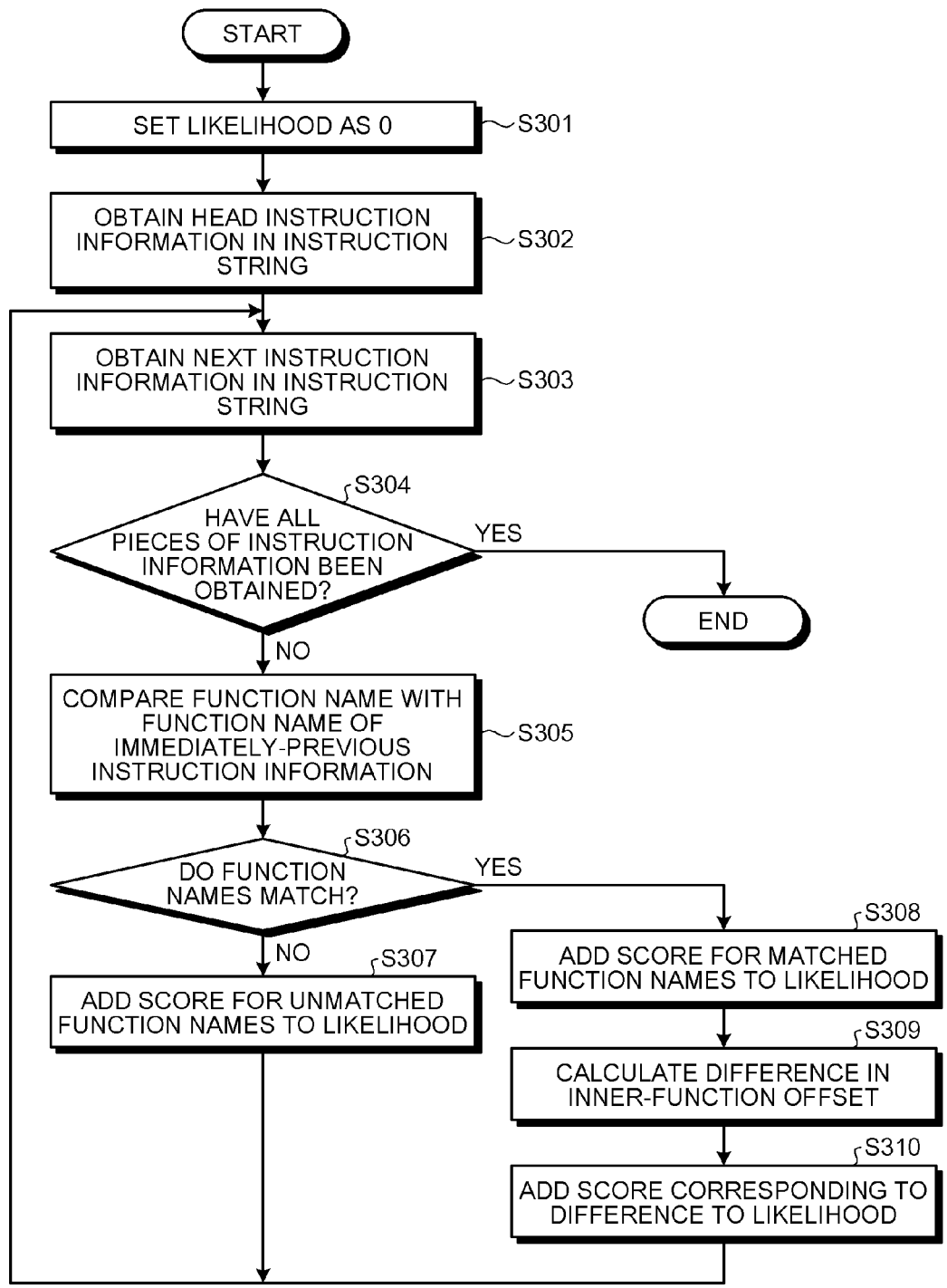
FIG. 13 is a flowchart of a procedure of a likelihood calculating process.

FIG. 13 is a flowchart of a procedure of a likelihood calculating process. In the likelihood calculating process, the likelihood calculating unit 113d first sets the likelihood as 0 (step S301). The likelihood calculating unit 113d then obtains one of the pieces of instruction information at the head from one of the combination patterns 123 for which a likelihood is to be obtained (step S302).

The likelihood calculating unit 113d then tries to obtain a next piece of instruction information from the combination pattern 123 for which a likelihood is to be calculated (step S303). Here, when all pieces of instruction information of the combination pattern 123 have been obtained ("Yes" at step S304), the likelihood calculating unit 113d ends the likelihood calculating process.

When the next piece of instruction information can be obtained from the combination pattern 123 ("No" at step S304), the likelihood calculating unit 113d compares the function name included in the currently-obtained instruction information with the function name included in the instruction information immediately previously obtained (step S305). When the function names do not match ("No" at step S306), the likelihood calculating unit 113d obtains a score for unmatched function names from the likelihood score data 125 and adds the score to the likelihood (step S307), and then restarts the process from step S303.

When the function names match ("Yes" at step S306) the likelihood calculating unit 113d obtains a score for matched function names from the likelihood score data 125 and adds the score to the likelihood (step S308). Furthermore, the likelihood calculating unit 113d subtracts the inner-function offset included in the instruction information immediately previously obtained from the inner-function offset included in the instruction information currently obtained to calculate a difference (step S309). Then, the likelihood calculating unit 113d obtains a score corresponding to the calculated difference from the likelihood score data 125 and adds the score to the likelihood (step S310), and then restarts the process from step S303.

As explained above, in the present embodiment, the sampling data obtained by sampling the instruction executed by the processor at predetermined intervals is divided into partial instruction strings, and the partial instruction strings are combined based on similarity and likelihood. Thus, a desired instruction trace can be obtained while reducing the frequency of obtaining information to a degree of not affecting the behavior of the currently-executed program.

Here, in the embodiment explained above, an example of generating an instruction trace from the sampling data obtained by sampling an instruction for every predetermined numbers is explained. The instruction-trace method according to the present embodiment can also be applied to sampling data obtained by sampling an instruction at predetermined time intervals. When the instruction-trace method according to the present embodiment is applied to sampling data obtained by sampling an instruction at predetermined time intervals, the obtained instruction trace is an execution-time-weighted instruction trace.

Figure 14:
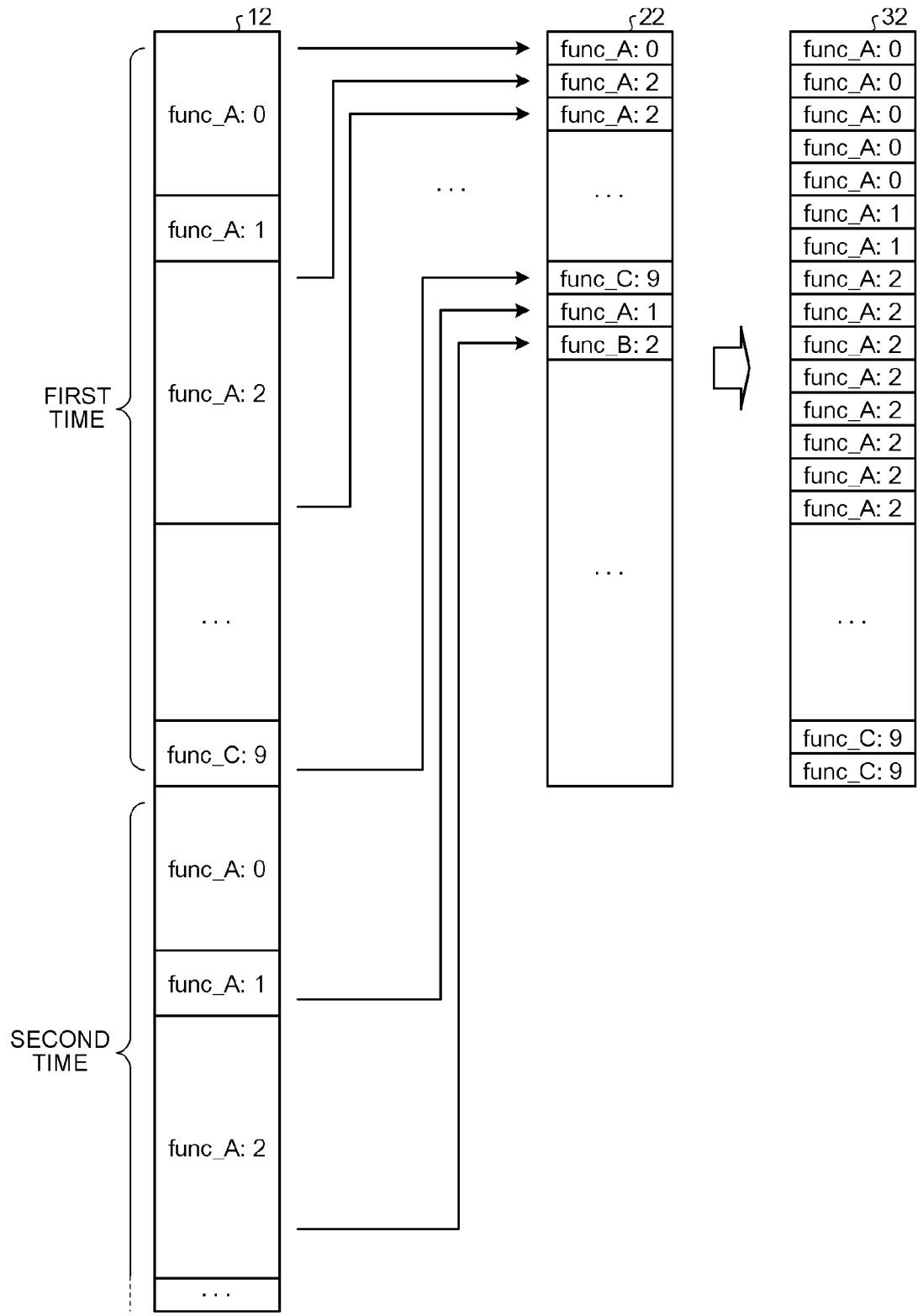
FIG. 14 is a drawing of an example of generation of an execution-time-weighted instruction trace.

FIG. 14 is a drawing of an example of generation of an execution-time-weighted instruction trace. An instruction string 12 is an instruction string corresponding to a normal instruction trace when the program depicted in FIG. 1 is operated, and sampling data 22 is an instruction string obtained by sampling an instruction executed by the processor at predetermined time intervals. Since the execution time of the instruction executed by the processor differs depending on the type of the instruction, the length of the execution time for each instruction is reflected to the sampling data 22.

By combining such sampling data 22 by using the instruction-trace method according to the present embodiment, an execution-time-weighted instruction trace 32 is obtained. In the execution-time-weighted instruction trace 32, the number of successive identical instructions indicates the execution time of the instruction. By generating this execution-time-weighted instruction trace, not only the execution order of the instructions but also the instruction execution time can be known, thereby obtaining very effective information for optimizing the program.

When an execution-time-weighted instruction trace is generated, since the identical instructions often successively appear in an instruction string, the similarity score data 124 and the likelihood score data 125 have to be set so that the score is the highest when the difference in inner-function offset is 0.

[b] Second Embodiment

In the first embodiment, an example of combining partial instruction strings based on function names and inner-function offsets is explained. Alternatively, in consideration of a Basic Block (hereinafter, "BB") accuracy of an instruction trace to be generated can be further increased. BB is a block of an instruction sectioned by a branch instruction, and is a unit smaller than a function.

Figure 15:
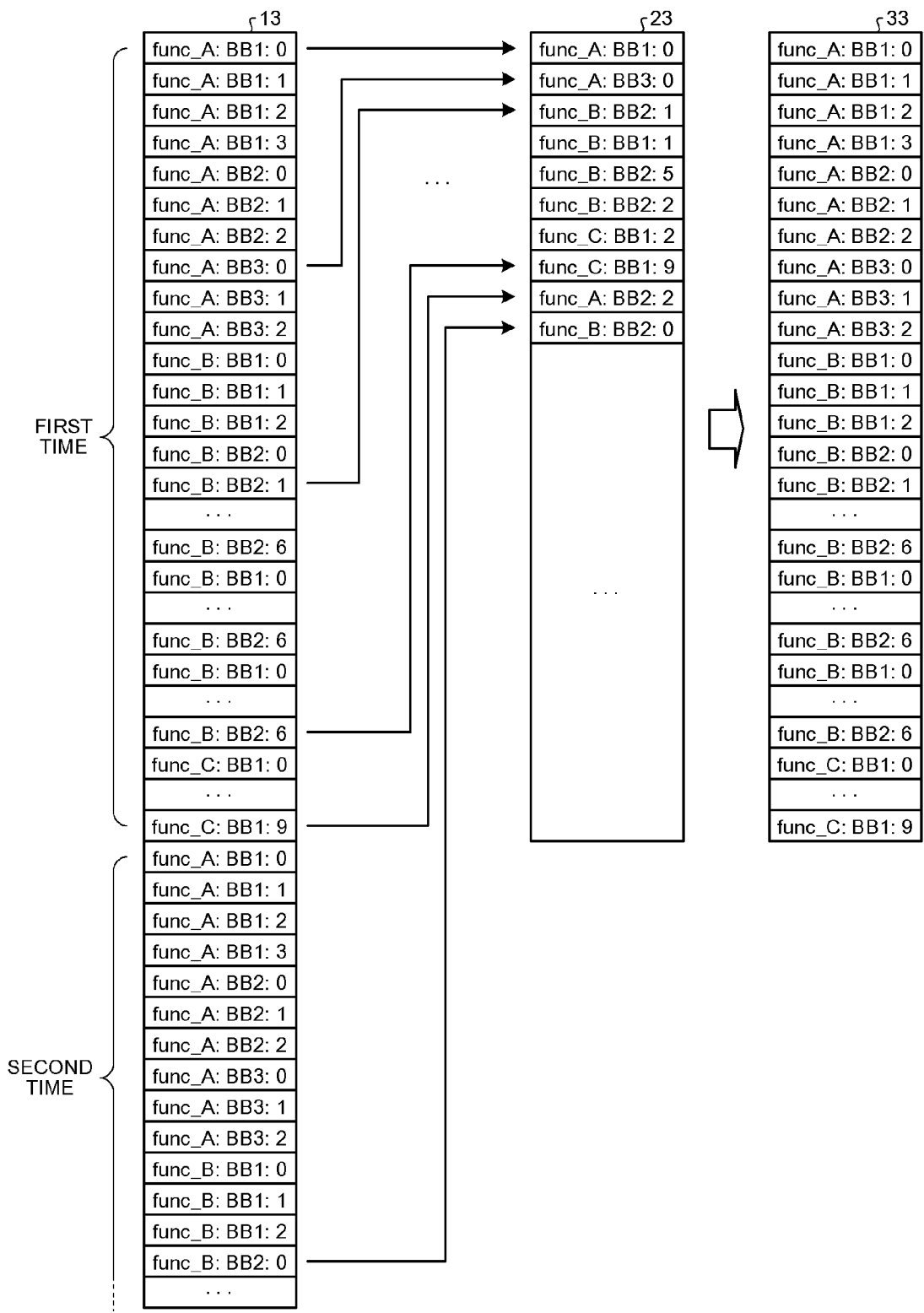
FIG. 15 is a drawing of an example of generation of an instruction trace in consideration of a basic block.

FIG. 15 is a drawing of an example of generation of an instruction trace in consideration of a BB. In a second embodiment, a character string provided to each instruction has a portion preceding the first ":", which represents the name of a function to which the instruction belongs. A portion between the first ":" and the second ":" represents an appearing order (hereinafter, "BB number") in a function of a BB to which the instruction belongs. A portion subsequent to the second ":" represents an offset of the instruction (hereinafter, "inner-BB offset") with reference to the head of the BB. For example, "func_A:BB1:0" represents that this is a head instruction of a BB appearing first in a function with a name "func_A( )".

In the program depicted in FIG. 1, it is assumed that "func_A( )" is formed of a first BB having four instructions, a second BB having three instructions, and a third BB having three instructions. It is also assumed that "func_B( )" is formed of a first BB having three instructions and a second BB having seven instructions and "func_C( )" is formed of one BB having ten instructions.

In this case, when the program depicted in FIG. 1 is operated, an instruction string 13 depicted in FIG. 15 is executed by the processor. Then, when sampling is made for every seven instructions executed by the processor, sampling data 23 is obtained. Thus obtained sampling data 23 is divided into partial instruction strings in units obtained while "func_M( )" for which an instruction trace is to be obtained is called once.

Then, the partial instruction strings are combined while calculating the similarity and likelihood based on the function name, BB number, and inner-BB offset, an instruction trace 33 can be obtained. Thus obtained instruction trace 33 is obtained through combining in consideration of the BBs, which are units smaller than functions. Therefore, it can be expected that the instructions are accurately placed in the order in which the instructions are actually executed by the processor.

Figure 16:
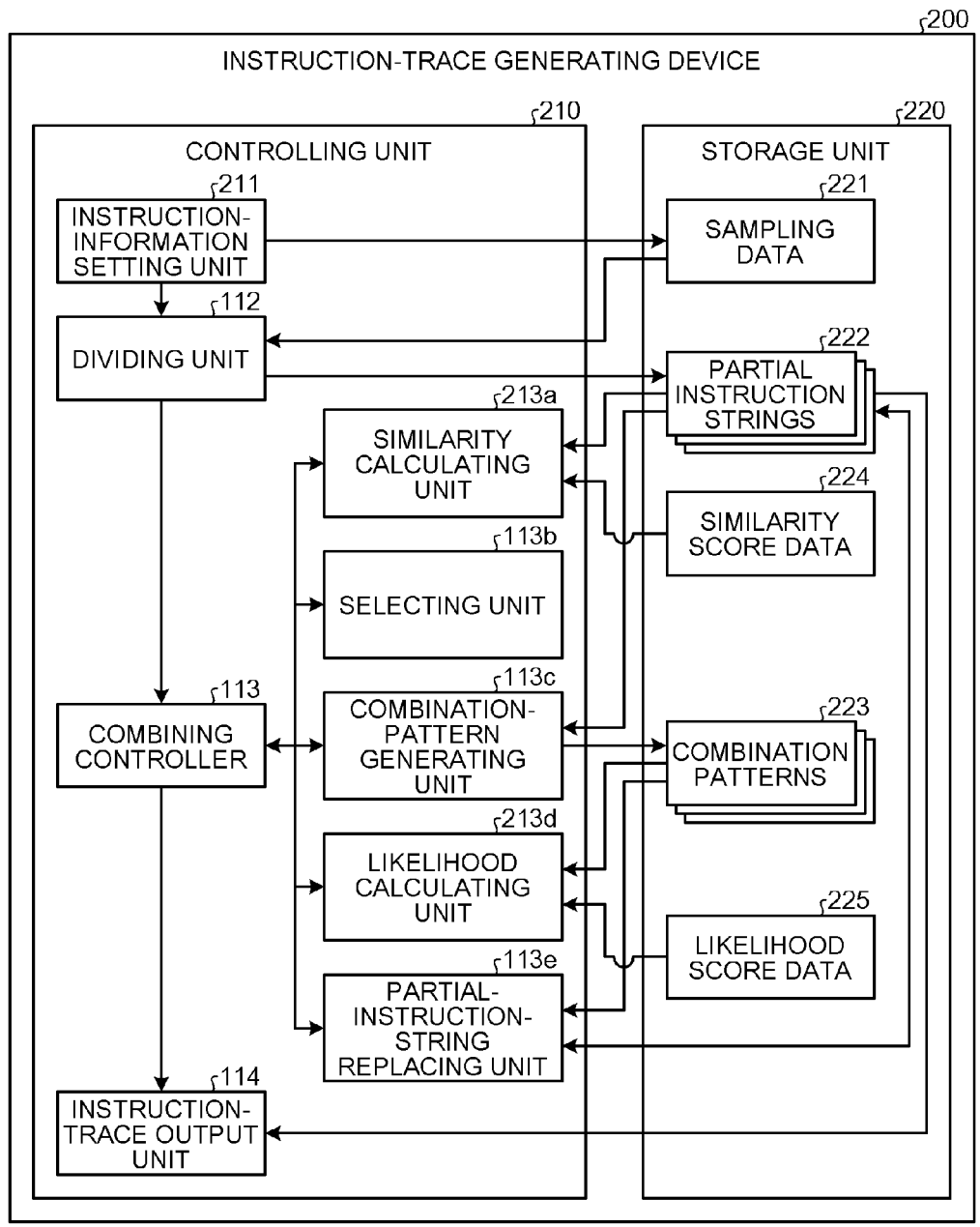
FIG. 16 is a functional block diagram depicting the configuration of an instruction-trace generating device according to a second embodiment.

Next, the configuration of the instruction-trace generating device that performs the instruction-trace generating method according to the second embodiment. FIG. 16 is a functional block diagram depicting the configuration of an instruction-trace generating device 200 according to the second embodiment. As depicted in FIG. 16, the instruction-trace generating device 200 includes a controlling unit 210 and a storage unit 220. In the following explanation, note that components identical to those already explained are provided with the same reference numerals as those provided to the components already explained, and are not redundantly explained.

The controlling unit 210 is a controlling unit that controls the entire instruction-trace generating device 200. The controlling unit 210 includes an instruction-information setting unit 211, the dividing unit 112, the combining controller 113, a similarity calculating unit 213a, the selecting unit 113b, the combination-pattern generating unit 113c, a likelihood calculating unit 213d, the partial-instruction-string replacing unit 113e, and the instruction-trace output unit 114.

The instruction-information setting unit 211 sets instruction information to sampling data 221 stored in the storage unit 220. The sampling data 221 is data obtained by sampling an instruction executed by the processor at predetermined intervals while an instruction string for which an instruction trace is to be obtained is executed a plurality of times, and contains a sufficient number of instructions for generating an instruction trace.

Specifically, the instruction-information setting unit 211 sets, for each instruction included in the sampling data 221, a function name, a BB number, and an inner-BB offset as instruction information. The function name can be obtained by, for example, checking the address of the instruction against a symbol table in the program. Also, the BB number and the inner-BB offset can be obtained by, for example, analyzing an instruction string in the program with reference to the head address of the function obtained by checking the address of the instruction against the symbol table in the program.

The similarity calculating unit 213a calculates a similarity for every combination of partial instruction strings 222 obtained by dividing the sampling data 221 by the dividing unit 112. The similarity is obtained by totaling scores (similarities for the respective instructions) obtained by comparing instructions included in each partial instruction string 222 sequentially from the head and checking the comparison result against similarity score data 224.

An example of the similarity score data 224 is depicted in FIG. 17. As depicted in FIG. 17, in the similarity score data 224, "5" is set as a score when the function names match, and "0", which is lower than "5", is set as a score when the function names do not match. Also, as a score provided based on the difference in BB number when the function names match, a higher value is set as the difference is closer to "0". Also, as a score provided based on the difference in inner-BB offset when the BB numbers match, a higher value is set as an absolute value of the difference is closer to "1".

The likelihood calculating unit 213d calculates a likelihood for each combination pattern 223 generated by the combination-pattern generating unit 113c. The likelihood is calculated by totaling scores (likelihoods for the respective instructions) obtained by comparing adjacent ones of the instructions included in each combination pattern 223 sequentially from the head and checking the comparison result against likelihood score data 225.

An example of the likelihood score data 225 is depicted in FIG. 18. As depicted in FIG. 18, in the likelihood score data 225, "5" is set as a score when the function names match, and "0", which is lower than "5", is set as a score when the function names do not match. Also, as a score provided based on the difference in BB number when the function names match, a higher value is set as the difference is closer to "0". Also, as a score provided based on the difference in inner-BB offset when the difference in BB number is 0, that is, when the BB numbers match, a higher value is set when the difference is positive as an absolute value of the difference is closer to "1".

The storage unit 220 is a storage device that stores various information, having stored therein the sampling data 221, the partial instruction strings 222, the combination patterns 223, the similarity score data 224, and the likelihood score data 225. Since such various data stored in the storage unit 220 have already been explained, they are not explained herein.

Figure 19:
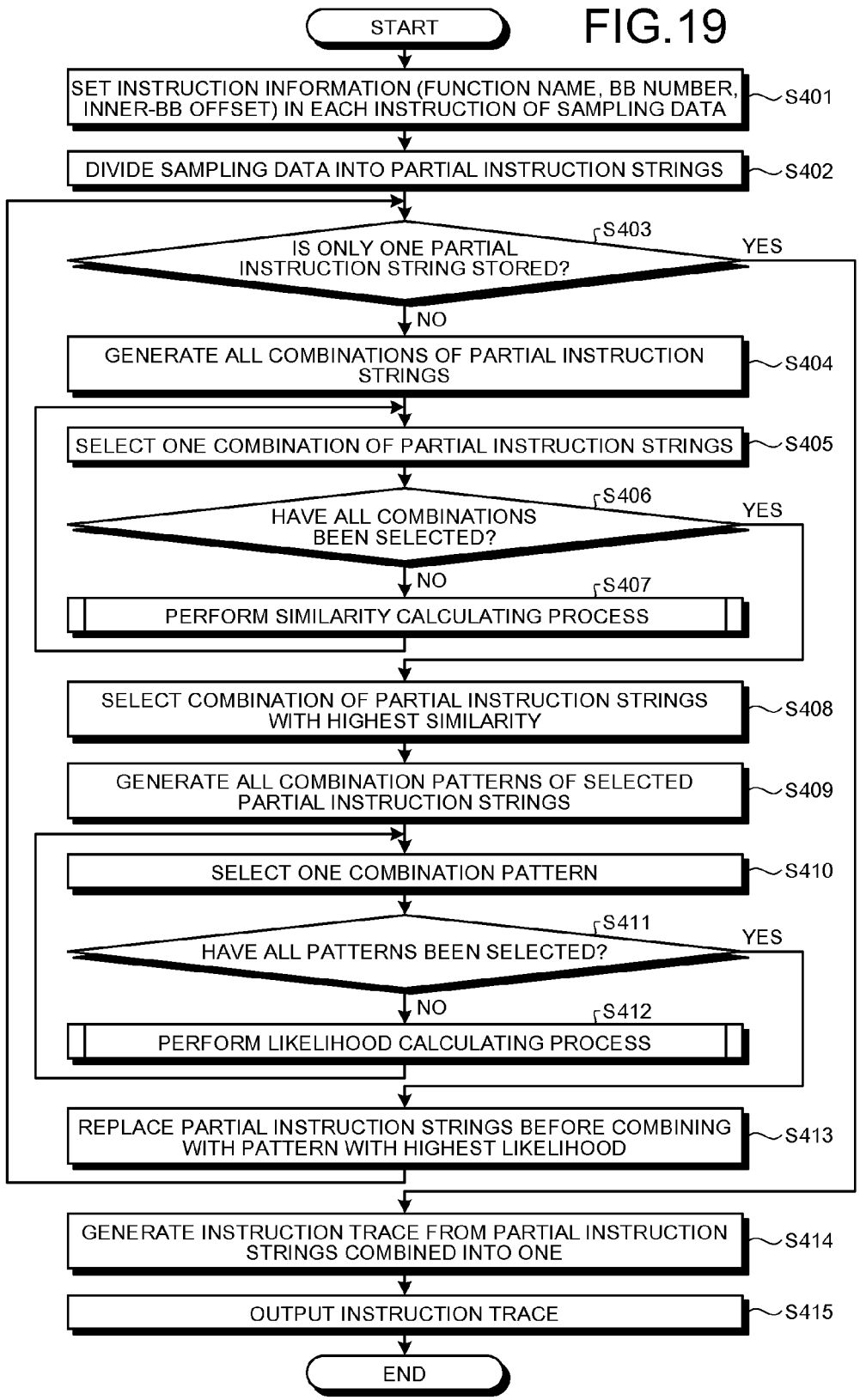
FIG. 19 is a flowchart of a procedure of an instruction-trace generating process.

Next, the operation of the instruction-trace generating device 200 depicted in FIG. 16 is explained. FIG. 19 is a flowchart of a procedure of the instruction-trace generating process by the instruction-trace generating device 200.

In the instruction-trace generating process, the instruction-information setting unit 211 first sets a function name, a BB number, and an inner-BB offset as instruction information in each instruction included in the sampling data 221 sampled in advance (step S401). The following processes are similar to those depicted in FIG. 11, except a similarity calculating process at step S407 and a likelihood calculating process at step S412.

Figure 20:
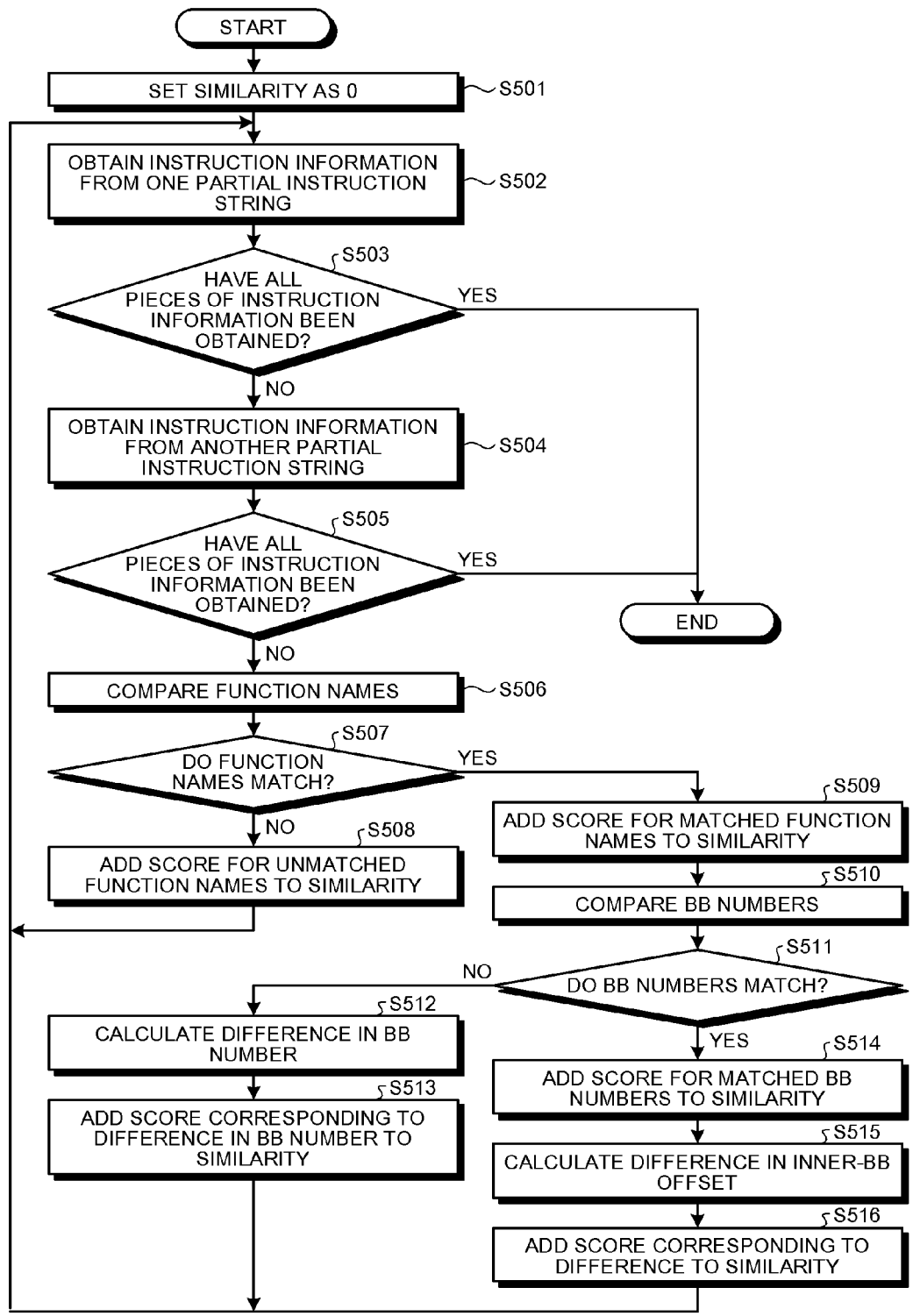
FIG. 20 is a flowchart of a procedure of a similarity calculating process.

FIG. 20 is a flowchart of a procedure of the similarity calculating process. In the similarity calculating process, the similarity calculating unit 213a first sets the similarity as 0 (step S501). The similarity calculating unit 213a then tries to obtain one of the pieces of instruction information not yet obtained at the head from one of the partial instruction strings 222 for which a similarity is to be calculated (step S502). Here, when all pieces of instruction information of the partial instruction string 222 have been obtained ("Yes" at step S503), the similarity calculating unit 213a ends the similarity calculating process.

On the other hand, when any instruction information can be obtained ("No" at step S503), the similarity calculating unit 213a obtains one of the pieces of instruction information not yet obtained at the head from the other one of the partial instruction strings 222 for which a similarity is to be calculated (step S504). Here, when all pieces of instruction information of the partial instruction string 222 have been obtained ("Yes" at step S505), the similarity calculating unit 213a ends the similarity calculating process.

When any instruction information can be obtained also from the other partial instruction string 222 ("No" at step S505), the similarity calculating unit 213a compares the function names included in the obtained pieces of instruction information (step S506). When the function names do not match ("No" at step S507), the similarity calculating unit 213a obtains a score for unmatched function names from the similarity score data 224 and adds the score to the similarity (step S508), and then restarts the process from step S502.

When the function names match ("Yes" at step S507) the similarity calculating unit 213a obtains a score for matched function names from the similarity score data 224 and adds the score to the similarity (step S509). Furthermore, the similarity calculating unit 213a compares BB numbers included in the obtained instruction information (step S510). When the BB numbers do not match ("No" at step S511), the similarity calculating unit 213a calculates a difference in BB number (step S512). Then, the similarity calculating unit 213a obtains a score corresponding to the calculated difference in BB number from the similarity score data 224 and adds the score to the similarity (step S513), and restarts the process from step S502.

On the other hand, when the BB numbers match ("Yes" at step S511), the similarity calculating unit 213a obtains a score for matched BB numbers from the similarity score data 224 and adds the score to the similarity (step S514). Furthermore, the similarity calculating unit 213a calculates a difference in inner-BB offset included in the obtained instruction information (step S515). The similarity calculating unit 213a then obtains a score corresponding to the calculated difference in inner-BB offset from the similarity score data 224 and adds the score to the similarity (step S516), and restarts the process from step S502.

Figure 21:
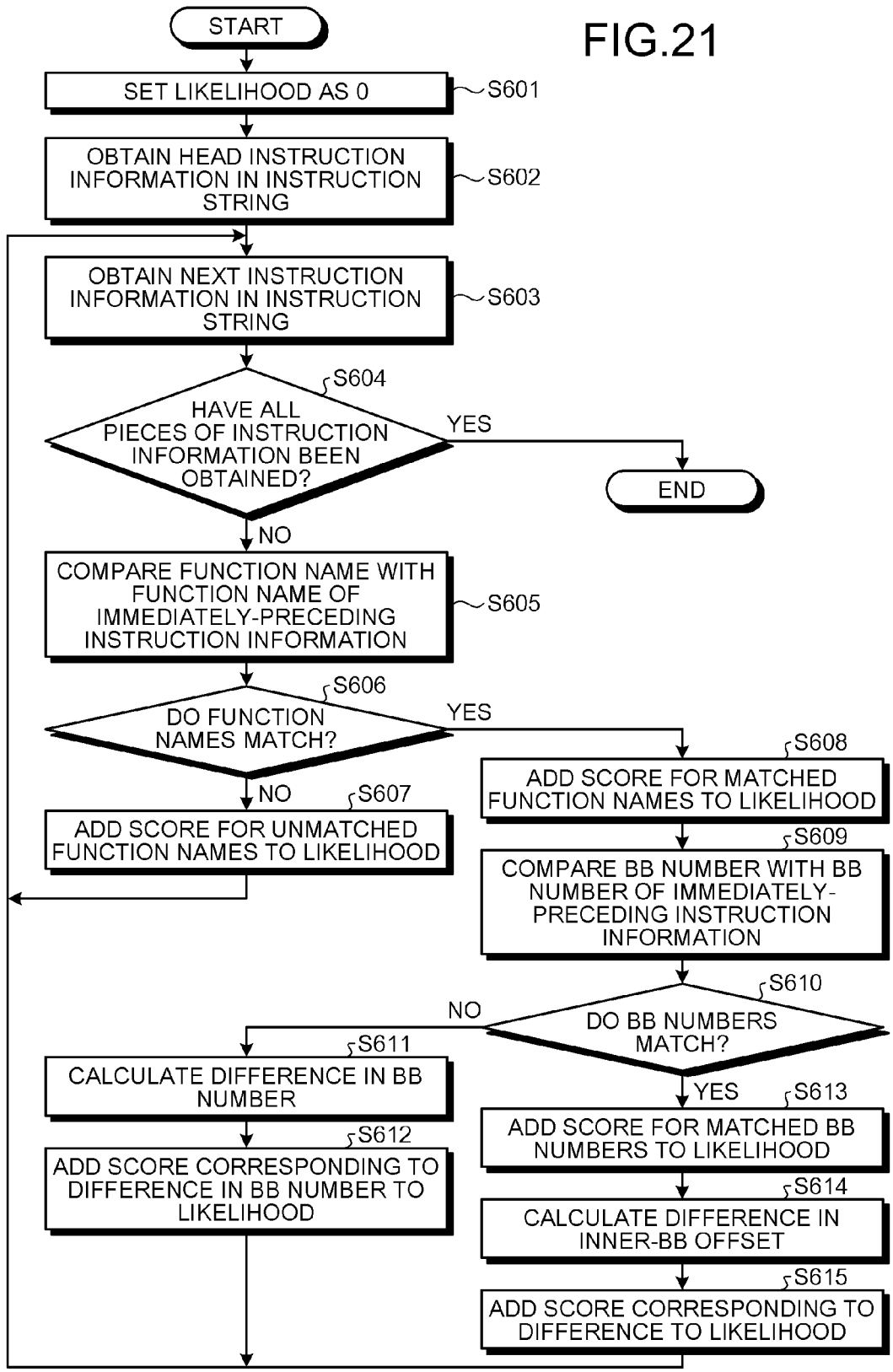
FIG. 21 is a flowchart of a procedure of a likelihood calculating process.

FIG. 21 is a flowchart of a procedure of the likelihood calculating process. In the likelihood calculating process, the likelihood calculating unit 213d first sets the likelihood as 0 (step S601). The likelihood calculating unit 213d then obtains one of the pieces of instruction information at the head from one of the combination patterns for which a likelihood is to be calculated (step S602).

The likelihood calculating unit 213d then tries to obtain a next piece of instruction information from the combination pattern 223 for which a likelihood is to be calculated (step S603). Here, when all pieces of instruction information of the combination pattern 223 have been obtained ("Yes" at step S604), the likelihood calculating unit 213d ends the likelihood calculating process.

When the next piece of instruction information can be obtained from the combination pattern 223 ("No" at step S604), the likelihood calculating unit 213d compares the function name included in the currently-obtained instruction information with the function name included in the instruction information immediately previously obtained (step S605). When the function names do not match ("No" at step S606), the likelihood calculating unit 213d obtains a score for unmatched function names from the likelihood score data 225 and adds the score to the likelihood (step S607), and then restarts the process from step S603.

When the function names match ("Yes" at step S606) the likelihood calculating unit 213d obtains a score for matched function names from the likelihood score data 225 and adds the score to the likelihood (step S608). Then, the likelihood calculating unit 213d compares the BB number included in the obtained instruction information with the BB number included in the immediately-preceding instruction information (step S609). When the BB numbers do not match ("No" at step S610), the likelihood calculating unit 213d calculates a difference in BB number (step S611). Then, the likelihood calculating unit 213d obtains a score corresponding to the calculated difference in BB number from the likelihood score data 225 and adds the score to the likelihood (step S612), and restarts the process from step S603.

On the other hand, when the BB numbers match ("Yes" at step S610), the likelihood calculating unit 213d obtains a score for matched BB numbers from the likelihood score data 225 and adds the score to the similarity (step S613). Furthermore, the likelihood calculating unit 213d subtracts the inner-BB offset included in the immediately-preceding instruction information from the inner-BB offset included in the currently-obtained instruction information to calculate a difference (step S614). The likelihood calculating unit 213d then obtains a score corresponding to the calculated difference from the likelihood score data 225 and adds the score to the likelihood (step S615), and restarts the process from step S603.

As explained above, in the present embodiment, partial instruction strings are combined in consideration of BBs. Therefore, an accurate instruction trace can be generated.

The configuration of the instruction-trace generating device 100 according to the first embodiment and the instruction-trace generating device 200 according to the second embodiment can be variously changed without deviating from the gist of the present invention. For example, the function of the controlling unit 110 of the instruction-trace generating device 100 and the function of the controlling unit 210 of the instruction-trace generating device 200 can be implemented as software and executed by a computer, thereby achieving functions similar to those of the instruction-trace generating devices 100 and 200. In the following, an example of a computer executing an instruction-trace generating program 1071 with the function of the controlling unit 110 being implemented as software is explained.

FIG. 22 is a functional block diagram of a computer 1000 that executes the instruction-trace generation program 1071. The computer 1000 includes a Central Processing Unit (CPU) 1010 that performs various computing processes, an input device 1020 that accepts data inputs from users, a monitor 1030 that displays various information, a medium reading device 1040 that reads a program and others from a recording medium, a network interface device 1050 that transmits and receives data to and from another computer via a network, a Random Access Memory (RAM) 1060 that temporarily stores various information, and a hard disk device 1070, all of which are connected via a bus 1080.

The hard disk device 1070 has stored therein the instruction-trace generation program 1071 having functions similar to the controlling unit 110 depicted in FIG. 8 and instruction-trace generating data 1072 corresponding to various data stored in the storage unit 120 depicted in FIG. 8. Here, the instruction-trace generating data 1072 may be distributed as appropriate and stored in another computer connected via a network.

With the CPU 1010 reading the instruction-trace generation program 1071 from the hard disk device 1070 and developing the program on the RAM 1060, the instruction-trace generation program 1071 can function as an instruction-trace generating process 1061. Then, in the instruction-trace generating process 1061, the information read from the instruction-trace generating data 1072 and others are developed on a region assigned on the RAM 1060 and, based on the developed data and others, various data processing is performed. Then, in the instruction-trace generating process 1061, instruction trace data 1073 generated through various data processing is stored in the hard disk device 1070.

Here, the instruction-trace generation program 1071 is not necessarily stored in the hard disk device 1070. This program may be stored in a storage medium, such as a compact-disk read only memory (CD-ROM), and may be read by the computer 1000 for execution. Also, this program may be stored in another computer (or a server) connected to the computer 1000 via a public line, the Internet, a Local Area Network (LAN), a Wide Area Network (WAN), or the like, and may be read by the computer 1000 for execution.

According to the instruction-trace generation program, instruction-trace generating device, and instruction-trace generating method disclosed herein, an effect can be achieved such that an accurate instruction trace can be generated even when the frequency of sampling an instruction is decreased to reduce overhead.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A processor-executing instruction-trace generating method of generating an instruction trace of a first instruction string from a second instruction string obtained by sampling, at predetermined intervals, the first instruction string executed a plurality of times, the instruction-trace generating method comprising:
   dividing the second instruction string into partial instruction strings and storing the partial instruction strings obtained through division in a storage unit;
   calculating a similarity for each combination of all of the partial instruction strings stored in the storage unit;
   selecting one of the combinations of the partial instruction strings based on the similarity calculated in the calculating of the similarity;
   generating a plurality of combination patterns by combining instructions included in the partial instruction strings selected in the selecting;
   calculating a likelihood for each of the combination patterns generated in the generating; and
   storing one of the combination patterns in the storage unit based on the likelihood calculated in the calculating of the likelihood, wherein the calculating of the likelihood, the likelihood is calculated based on a function name of a function to which an instruction included in the partial instruction string belongs, a basic block in which the instruction in included, and an offset of the instruction from a head of the basic block.

2. The instruction-trace generating method according to claim 1, further comprising controlling a combining, wherein
   in the selecting, a combination of partial instruction strings with a highest similarity calculated in the calculating of the similarity is selected,
   in the storing, a combination pattern with a highest likelihood calculated in the calculating the likelihood is stored as a partial instruction string in the storage unit in place of the partial instruction strings selected in the selecting, and
   in the controlling of the combining, the calculating of the similarity, the selecting, the generating, and the storing are controlled until the partial instruction strings stored in the storage unit become one.

3. The instruction-trace generating method according to claim 1, wherein
in the calculating of the similarity, the similarity is calculated based on a function name of a function to which an instruction included in the partial instruction string belongs and an offset of the instruction from a head of the function.

4. The instruction-trace generating method according to claim 1, wherein
in the calculating of the similarity, the similarity is calculated based on a function name of a function to which an instruction included in the partial instruction string belongs, a basic block in which the instruction is included, and an offset of the instruction from a head of the basic block.

5. The instruction-trace generating method according to claim 1, wherein
in the calculating of the likelihood, the likelihood is calculated based on a function name of a function to which an instruction included in the partial instruction string belongs and an offset of the instruction from a head of the function.

6. A non-transitory computer readable storage medium containing instructions for generating an instruction trace of a first instruction string from a second instruction string obtained by sampling, at predetermined intervals, the first instruction string executed a plurality of times, wherein the instructions, when executed by a computer, cause the computer to perform:
dividing the second instruction string into partial instruction strings and storing the partial instruction strings obtained through division in a storage unit;
calculating a similarity for each combination of all of the partial instruction strings stored in the storage unit;
selecting one of the combinations of the partial instruction strings based on the similarity calculated in the calculating of the similarity;
generating a plurality of combination patterns by combining instructions included in the partial instruction strings selected in the selecting;
calculating a likelihood for each of the combination patterns generated in the generating; and
storing one of the combination patterns in the storage unit based on the likelihood calculated in the calculating of the likelihood wherein the calculating of the likelihood, the likelihood is calculated based on a function name of a function to which an instruction included in the partial instruction string belongs, a basic block in which the instruction in included, and an offset of the instruction from a head of the basic block.

7. The computer readable storage medium according to claim 6, the instructions further cause the computer to perform controlling a combining, wherein
in the selecting, a combination of partial instruction strings with a highest similarity calculated in the calculating of the similarity is selected,
in the storing, a combination pattern with a highest likelihood calculated in the calculating the likelihood is stored as a partial instruction string in the storage unit in place of the partial instruction strings selected in the selecting, and
in the controlling of the combining, the calculating of the similarity, the selecting, the generating, and the storing are controlled until the partial instruction strings stored in the storage unit become one.

8. The computer readable storage medium according to claim 6, wherein
in the calculating of the similarity, the similarity is calculated based on a function name of a function to which an instruction included in the partial instruction string belongs and an offset of the instruction from a head of the function.

9. The computer readable storage medium according to claim 6, wherein
in the calculating of the likelihood, the likelihood is calculated based on a function name of a function to which an instruction included in the partial instruction string belongs and an offset of the instruction from a head of the function.

10. The computer readable storage medium according to claim 6, wherein
in the calculating of the similarity, the similarity is calculated based on a function name of a function to which an instruction included in the partial instruction string belongs, a basic block in which the instruction is included, and an offset of the instruction from a head of the basic block.

11. An instruction-trace generating device having a processor that generates an instruction trace of a first instruction string from a second instruction string obtained by sampling, at predetermined intervals, the first instruction string executed a plurality of times, the instruction-trace generating device comprising:
a dividing unit that divides the second instruction string into partial instruction strings and causes the partial instruction strings obtained through division to be stored in a storage unit;
a similarity calculating unit that calculates a similarity for each combination of all of the partial instruction strings stored in the storage unit;
a selecting unit that selects one of the combinations of the partial instruction strings based on the similarity calculated by the similarity calculating unit;
a combination-pattern generating unit that generates a plurality of combination patterns by combining instructions included in the partial instruction strings selected by the selecting unit;
a likelihood calculating unit that calculates a likelihood for each of the combination patterns generated by the combination-pattern generating unit; and
a partial-instruction-string replacing unit that causes the combination patterns to be stored in the storage unit based on the likelihood calculated by the likelihood calculating unit wherein the calculating of the likelihood, the likelihood is calculated based on a function name of a function to which an instruction included in the partial instruction string belongs, a basic block in which the instruction in included, and an offset of the instruction from a head of the basic block.

12. The instruction-trace generating device according to claim 11, further comprising a combining controller, wherein
the selecting unit selects a combination of partial instruction strings with a highest similarity calculated by the similarity calculating unit,
the partial-instruction-string replacing unit causes a combination pattern with a highest likelihood calculated by the likelihood calculating unit to be stored as a partial instruction string in the storage unit in place of the partial instruction strings selected by the selecting unit, and
the combining controller controls the similarity calculating unit, the selecting unit, the combination-pattern generating unit, and the partial-instruction-string replacing unit until the partial instruction strings stored in the storage unit become one.

13. The instruction-trace generating device according to claim 11, wherein
the similarity calculating unit calculates the similarity based on a function name of a function to which an instruction included in the partial instruction string belongs and an offset of the instruction from a head of the function.

14. The instruction-trace generating device according to claim 11, wherein
the likelihood calculating unit calculates the likelihood based on a function name of a function to which an instruction included in the partial instruction string belongs and an offset of the instruction from a head of the function.

15. The instruction-trace generating device according to claim 11, wherein
the similarity calculating unit calculates the similarity based on a function name of a function to which an instruction included in the partial instruction string belongs, a basic block in which the instruction is included, and an offset of the instruction from a head of the basic block.

* * * * *

UNITED STATES PATENT AND TRADEMARK OFFICE
CERTIFICATE OF CORRECTION

| | |
|---|---|
| PATENT NO. | : 8,286,141 B2 |
| APPLICATION NO. | : 12/404077 |
| DATED | : October 9, 2012 |
| INVENTOR(S) | : Naruse |

Page 1 of 1

It is certified that error appears in the above-identified patent and that said Letters Patent is hereby corrected as shown below:

On the Title page of the Patent:

In the 2nd Column

Item [56] OTHER PUBLICATIONS (Continued)
Title Page 2, First Column

Delete:

"James Newsome, Replayer: Automatic Protocol Replay by Binary Ansuman Banerjee, Golden Implementation Driven Software Debugging, 2010, ACM. 10 pages, <URL: http://delivery.acm.org/10.1145/1890000/1882319/p177-banerjee.pdf>.* Analysis, 2006, ACM, <URL: http://delivery.acm.org/10.1145/1190000/1180444/p311-newsome.pdf>,*"

and in its place, insert:

--Ansuman Banerjee, Golden Implementation Driven Software Debugging, 2010, ACM. 10 pages, <URL: http://delivery.acm.org/10.1145/1890000/1882319/p177-banerjee.pdf>.--

--James Newsome, Replayer: Automatic Protocol Replay by Binary Analysis 2006, ACM. <URL: http://delivery.acm.org/10.1145/1190000/1180444/p311-newsome.pdf>.--

Signed and Sealed this
Twenty-ninth Day of January, 2013

David J. Kappos
*Director of the United States Patent and Trademark Office*